United States Patent
Saito et al.

(10) Patent No.: US 11,888,351 B2
(45) Date of Patent: Jan. 30, 2024

(54) CORE, STATOR, AND ROTARY ELECTRIC MACHINE

(71) Applicants: Sumitomo Electric Industries, Ltd., Osaka (JP); Sumitomo Electric Sintered Alloy, Ltd., Takahashi (JP)

(72) Inventors: Tatsuya Saito, Osaka (JP); Yuichi Nakamura, Osaka (JP); Tomoyuki Ueno, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 327 days.

(21) Appl. No.: 17/278,333

(22) PCT Filed: Sep. 5, 2019

(86) PCT No.: PCT/JP2019/035081
§ 371 (c)(1),
(2) Date: Mar. 22, 2021

(87) PCT Pub. No.: WO2020/100385
PCT Pub. Date: May 22, 2020

(65) Prior Publication Data
US 2021/0351639 A1 Nov. 11, 2021

(30) Foreign Application Priority Data
Nov. 12, 2018 (JP) ................................. 2018-212322

(51) Int. Cl.
*H02K 1/14* (2006.01)
*H02K 1/18* (2006.01)

(52) U.S. Cl.
CPC ............. *H02K 1/182* (2013.01); *H02K 1/148* (2013.01)

(58) Field of Classification Search
CPC ........... H02K 1/148; H02K 21/24; H02K 1/82
See application file for complete search history.

(56) References Cited

U.S. PATENT DOCUMENTS

| | | | |
|---|---|---|---|
| 2003/0189386 A1* | 10/2003 | Carl ...................... | H02K 1/2795 310/254.1 |
| 2011/0095628 A1* | 4/2011 | Enomoto ............... | H02K 1/148 310/44 |

FOREIGN PATENT DOCUMENTS

| JP | 2005-287217 A | 10/2005 |
|---|---|---|
| JP | 2005287217 A * | 10/2005 |

(Continued)

OTHER PUBLICATIONS

WO 2017221512 A1 Machine Translation (Year: 2017).*

(Continued)

*Primary Examiner* — Quyen P Leung
*Assistant Examiner* — Masoud Vaziri
(74) *Attorney, Agent, or Firm* — XSENSUS LLP

(57) ABSTRACT

A core that is used in an axial-gap rotary electric machine and that includes a body, and frame-shaped flange portions. The body includes an annular yoke and columnar teeth that are arranged in a circumferential direction of the yoke. The flange portions are fixed to end portions of the respective teeth. The yoke and the teeth are composed of a single powder compact. Each of the flange portions is composed of a powder compact that has a through-hole. The end portion of each of the teeth is inserted in the through-hole, and an end surface of each of the teeth is exposed from the through-hole. A ratio of an area of the end surface of each of the teeth to an area within an outer circumferential edge of each of the flange portions is 7.5% or more in a plan view in an axial direction of the yoke.

16 Claims, 7 Drawing Sheets

(56) References Cited

FOREIGN PATENT DOCUMENTS

| | | | | | |
|---|---|---|---|---|---|
| JP | 2006-14436 | A | | 1/2006 | |
| JP | 2006-204052 | A | | 8/2006 | |
| JP | 2006204052 | A | * | 8/2006 | ............ H02K 1/148 |
| JP | 2006-311702 | A | | 11/2006 | |
| JP | 2006311702 | A | * | 11/2006 | |
| JP | 2009-44829 | A | | 2/2009 | |
| JP | 2010-284025 | A | | 12/2010 | |
| JP | 2010284025 | A | * | 12/2010 | |
| JP | 2014-531185 | A | | 11/2014 | |
| JP | 2014-230444 | A | | 12/2014 | |
| JP | 2014230444 | A | * | 12/2014 | |
| WO | 2013/060601 | A1 | | 5/2013 | |
| WO | WO-2017221512 | A1 | * | 12/2017 | .............. H01F 3/08 |

OTHER PUBLICATIONS

International Search Report and Written Opinion dated Nov. 26, 2019, received for PCT Application PCT/JP2019/035081 Filed on Sep. 5, 2019, 10 pages including English Translation.

* cited by examiner ial surface of an end portion of a tooth and an inner
CORE, STATOR, AND ROTARY ELECTRIC MACHINE

CROSS-REFERENCE TO RELATED APPLICATIONS

The present application is based on PCT filing PCT/JP2019/035081, filed Sep. 5, 2019, which claims priority to Japanese Patent Application No. 2018-212322, filed on Nov. 12, 2018, the entire contents of each are incorporated herein by reference.

TECHNICAL FIELD

The present disclosure relates to a core, a stator, and a rotary electric machine.

BACKGROUND ART

PTL 1 discloses an axial-gap motor in which a rotor and a stator face each other in the axial direction of the rotor, which is one of rotary electric machines. A stator that is used in this kind of rotary electric machine includes a core that includes a yoke and teeth, and coils that are disposed on the teeth. Representatively, the yoke is an annular member having a plate shape. Each tooth is a columnar member that extends in the axial direction of the yoke and is arranged in an interval in the circumferential direction of the yoke. PTL 1 also discloses that flange portions having a plate shape are disposed on end portions of the teeth opposite ends coupled with the yoke.

CITATION LIST

Patent Literature

PTL 1: Japanese Unexamined Patent Application Publication No. 2009-044829

SUMMARY OF INVENTION

A core according to the present disclosure is
a core that is used in an axial-gap rotary electric machine including
a body, and frame-shaped flange portions.
The body includes an annular yoke and columnar teeth that are arranged in a circumferential direction of the yoke.
The flange portions are fixed to end portions of the respective teeth.
The yoke and the teeth are composed of a single powder compact.
Each of the flange portions is composed of a powder compact that has a through-hole.
The end portion of each of the teeth is inserted in the through-hole, and an end surface of each of the teeth is exposed from the through-hole.
A ratio of an area of the end surface of each of the teeth to an area within an outer circumferential edge of each of the flange portions is 7.5% or more in a plan view in an axial direction of the yoke.
A stator according to the present disclosure includes
the core according to the present disclosure, and
coils that are disposed on the respective teeth.
A rotary electric machine according to the present disclosure includes
the stator according to the present disclosure.

DESCRIPTION OF EMBODIMENTS

Figure 1:
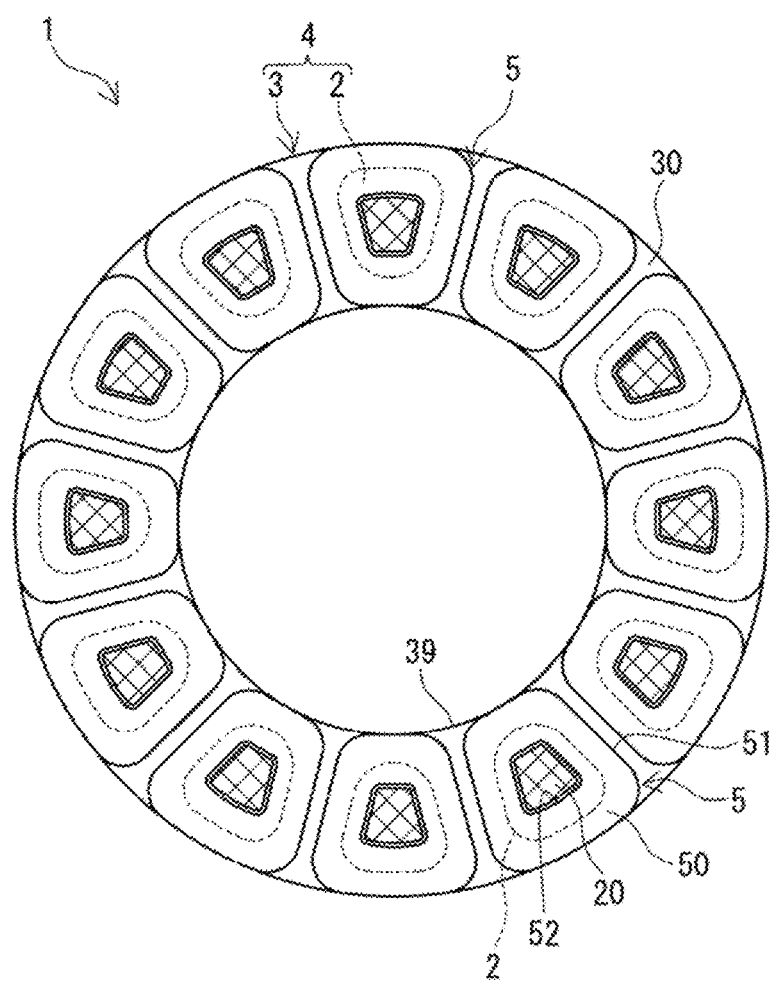
FIG. 1 is a schematic plan view illustrating an example of a core according to an embodiment.

Problems to be Solved by Present Disclosure

A core that is used in an axial-gap rotary electric machine preferably enables a stator to be readily assembled and enables the rotary electric machine to obtain high torque.

In view of this, it is an object of the present disclosure to provide a core that enables a rotary electric machine having high torque to be constructed and that enables a stator to have excellent manufacturability.

In addition, it is another object of the present disclosure to provide a stator that enables a rotary electric machine having high torque to be constructed and that has excellent manufacturability.

Furthermore, it is another object of the present disclosure to provide a rotary electric machine having high torque and excellent manufacturability.

Advantageous Effects of Present Disclosure

A core according to the present disclosure enables a rotary electric machine having high torque to be constructed and enables a stator to have excellent manufacturability.

A stator according to the present disclosure enables a rotary electric machine having high torque to be constructed and has excellent manufacturability.

A rotary electric machine according to the present disclosure has high torque and excellent manufacturability.

DESCRIPTION OF EMBODIMENT OF PRESENT DISCLOSURE

An embodiment of the present disclosure will be first listed and described.

(1) A core according to an aspect of the present disclosure is a core that is used in an axial-gap rotary electric machine and that includes a body, and frame-shaped flange portions.

The body includes an annular yoke and columnar teeth that are arranged in a circumferential direction of the yoke.

The flange portions are fixed to end portions of the respective teeth.

The yoke and the teeth are composed of a single powder compact.

Each of the flange portions is composed of a powder compact that has a through-hole.

The end portion of each of the teeth is inserted in the through-hole, and an end surface of each of the teeth is exposed from the through-hole.

A ratio of an area of the end surface of each of the teeth to an area within an outer circumferential edge of each of the flange portions is 7.5% or more in a plan view in an axial direction of the yoke.

The core according to the present disclosure includes the flange portions. For this reason, the core according to the present disclosure exerts effects: magnetic flux readily passes through the teeth by using the flange portions, and coils are readily prevented from falling by using the flange portions, and a stator has excellent workability of assembly. A reason why the stator has excellent workability of assembly is that the core according to the present disclosure is a combination including the body and the flange portions, and the coils can be disposed on the respective teeth with no flange portions are included. Accordingly, the core according to the present disclosure enables the stator and the axial-gap rotary electric machine to be readily manufactured.

In addition, the core according to the present disclosure can inhibit torque from decreasing and enables an axial-gap rotary electric machine having high torque to be constructed as described later.

The core according to the present disclosure is the combination as described above, but the yoke and the teeth are integrally formed into a single piece. For this reason, there are no spaces that can be magnetic gaps between the yoke and the teeth. The core according to the present disclosure enables the magnetic flux to successfully pass through the yoke from the teeth unlike a core in PTL 1 in which a yoke and teeth are separated members. In particular, as for the core according to the present disclosure, the ratio of the area of the end surface of each tooth to the area within the outer circumferential edge of each flange portion is 7.5% or more and is high. The ratio of the area described above is referred to as an exposed area ratio in some cases. Since the exposed area ratio described above is high, the teeth that are exposed from the through-holes of the flange portions can directly receive the magnetic flux, and the magnetic flux readily passes through the teeth from the flange portions. Consequently, the torque is readily inhibited from decreasing.

In addition, the core according to the present disclosure includes the flange portions but can inhibit cogging torque from increasing. In the case where the flange portions are included, the distance between the adjacent flange portions is typically short, and the cogging torque is likely to increase. However, the core according to the present disclosure can use spaces between the inner circumferential surfaces of the flange portions and the outer circumferential surfaces of the teeth as the magnetic gaps. The spaces described above can increase magnetic resistance, and changes in the magnetic flux due to rotation of a magnet are readily decreased. For this reason, the cogging torque is readily inhibited from increasing.

(2) In an aspect as an example of the core according to the present disclosure, each of the flange portions has a proximity region in which a distance between an outer circumferential surface of the end portion and an inner circumferential surface around the through-hole is 0.05 mm or less.

In the aspect described above, the distances between the teeth and the proximity regions of the flange portions described above are very short. For this reason, the proximity regions of the flange portions in the aspect described above can be regarded as regions that are substantially in contact with the teeth. It can be said that the spaces that can be between the proximity regions of the flange portions and the teeth are unlikely to be the magnetic gaps. For this reason, in the aspect described above, the magnetic flux readily passes through the teeth from the proximity regions of the flange portions. Accordingly, in the aspect described above, the torque is more readily inhibited from decreasing, and an axial-gap rotary electric machine having high torque can be constructed.

(3) In an aspect as an example of the core described in (2), a ratio of a length of the proximity region in a circumferential direction of the through-hole to a circumferential length of the through-hole is more than 20%.

In the aspect described above, the proximity regions of the flange portions are long, and the magnetic flux more readily passes through the teeth from the proximity regions of the flange portions. Accordingly, in the aspect described above, the torque is more readily inhibited from decreasing, and an axial-gap rotary electric machine having higher torque can be constructed.

(4) In an aspect as an example of the core described in (2) or (3), a difference between a maximum value and a minimum value of the distance between the outer circumferential surface of the end portion and the inner circumferential surface around the through-hole is less than 0.40 mm.

In the aspect described above, it can be said that there is no portion at which the distance described above locally increases, that is, there is no portion that becomes the large magnetic gap. For this reason, in the aspect described above, the magnetic flux readily passes through the teeth from the flange portions. Accordingly, in the aspect described above, the torque is readily inhibited from decreasing, and an axial-gap rotary electric machine having high torque can be constructed.

(5) In an aspect as an example of the core described in any one of (2) to (4), each of the flange portions has the proximity region at least a part of which is located on a side of the flange portion near an outer circumferential edge of the yoke.

In the aspect described above, the lengths of the proximity regions can be readily increased as described later. In the aspect described above, since the proximity regions are long, the magnetic flux more readily passes through the teeth from the proximity regions of the flange portions. Accordingly, in the aspect described above, the torque is more readily inhibited from decreasing, and an axial-gap rotary electric machine having higher torque can be constructed.

Representatively, the external shape of each flange portion is a trapezoidal shape. The length of a region of the flange portion having such a shape near the outer circumferential edge of the yoke is more than the length of a region near the inner circumferential edge of the yoke. The region of the flange portion described above near the outer circumferential edge of the yoke, that is, the region of the flange portion described above outside the edge of the end surface of the tooth that is exposed from the through-hole is referred to as an outer circumferential region in some cases. The region of the flange portion described above near the inner circumferential edge of the yoke, that is, the region of the flange portion described above inside the edge of the end surface of the tooth that is exposed from the through-hole is referred to as an inner circumferential region in some cases. The core that includes the proximity regions in the outer circumferential regions of the flange portions enables the lengths of the proximity regions to be increased.

(6) In an aspect as an example of the core described in any one of (2) to (5), the flange portions that are fixed to the teeth adjacent to each other in the circumferential direction of the yoke have the proximity regions at least parts of which are located on sides that the teeth face.

In the aspect described above, the proximity regions of the adjacent flange portions face each other. For this reason, the adjacent teeth enable the magnetic flux to readily pass via the proximity regions of the respective flange portions. Accordingly, in the aspect described above, the torque is readily inhibited from decreasing, and an axial-gap rotary electric machine having high torque can be constructed. In the case where the aspect described above is used for a polyphase alternating current rotary electric machine, coils for the same phase or coils for a different phase may be disposed on the respective teeth.

(7) In an aspect as an example of the core described in (6), coils for the same phase are disposed on the adjacent teeth.

In the aspect described above, the torque is more readily inhibited from decreasing unlike the case where coils for a different phase are disposed.

(8) In an aspect as an example of the core described in any one of (2) to (5), each of the flange portions has the proximity region at least a part of which is located on the same side in the circumferential direction of the yoke.

In the aspect described above, the magnetic flux readily passes through the teeth from the proximity regions of the respective flange portions. Accordingly, in the aspect described above, the torque is readily inhibited from decreasing, and an axial-gap rotary electric machine having high torque can be constructed. In the aspect described above, the state in which the flange portions are fixed to the respective teeth can be made uniform, and the core has excellent manufacturability.

(9) In an aspect as an example of the core according to the present disclosure, the teeth have step portions on which the flange portions are placed.

In the aspect described above, the flange portions can be stably disposed on the teeth, and the teeth and the flange portions are readily fixed to each other. Accordingly, in the aspect described above, the core has excellent manufacturability.

(10) In an aspect as an example of the core described in (9), heights of the step portions are equal to or more than thicknesses of the flange portions.

In the aspect described above, when the heights of the step portions are equal to the thicknesses of the flange portions, representatively, the end surfaces of the teeth and the end surfaces of the flange portions are flush with each other. For this reason, the distance between a rotor and a stator that includes the core in the aspect described above can be readily adjusted. In the aspect described above, when the heights of the step portions are more than the thicknesses of the flange portions, the cogging torque is readily decreased.

(11) In an aspect as an example of the core described in (10), differences between the heights of the step portions and the thicknesses of the flange portions are more than 0 mm and no more than 3 mm.

In the aspect described above, since the differences described above satisfy a predetermined range described above, the cogging torque is decreased, and the torque can be inhibited from decreasing.

(12) In an aspect as an example of the core described in any one of (9) to (11), angles formed between bottom surfaces of the step portions and circumferential surfaces of the step portions are 90°, and angles formed between an inner circumferential surface around the through-hole and surfaces of the flange portions that are placed on the bottom surfaces of the step portions are 90°.

In the aspect described above, the step portions and the flange portions have simple shapes and are readily compacted. For this reason, in the aspect described above, the core has excellent manufacturability.

(13) In an aspect as an example of the core described in (11), the end portion of each of the teeth has an inclined surface that intersects the end surface of the tooth, and an angle formed between the inclined surface and an extension surface from the end surface is no less than 5° and no more than 60°.

In the aspect described above, the cogging torque is readily decreased in the case where the inclined surface of each tooth protrudes from the end surface of the flange portion.

(14) In an aspect as an example of the core according to the present disclosure, a material of the core contains pure iron, an iron-based alloy containing Si, or an iron-based alloy containing Al.

In the aspect described above, when the pure iron is contained, the following effects are exerted: the core readily has high saturation flux density, the core is likely to be dense, the core is readily compacted and has excellent manufacturability. In the aspect described above, when the iron-based alloy is contained, the core readily has low loss.

(15) In an aspect as an example of the core according to the present disclosure, a relative density of the core is 90% or more.

In the aspect described above, the relative density is 90% or more and is high, which means being dense. In the aspect, an axial-gap rotary electric machine having excellent magnetic characteristics such as a high saturation flux density can be constructed.

(16) A stator according to an aspect of the present disclosure includes
 the core described in any one of (1) to (15), and
 coils that are disposed on the respective teeth.

Since the stator according to the present disclosure includes the core according to the present disclosure, the coils can be readily disposed on the respective teeth. Accordingly, the stator according to the present disclosure has excellent manufacturability. In addition, since the stator according to the present disclosure includes the core according to the present disclosure, the torque can be inhibited from decreasing, and an axial-gap rotary electric machine having high torque can be constructed.

(17) A rotary electric machine according to an aspect of the present disclosure includes
 the stator according to the present disclosure.

Since the rotary electric machine according to the present disclosure includes the stator according to the present disclosure, the stator is readily assembled, and the rotary electric machine has excellent manufacturability. In addition, since the rotary electric machine according to the present disclosure includes the stator according to the present disclosure, the torque can be inhibited from decreasing, and the rotary electric machine has high torque.

Detail of Embodiment of Present Disclosure

An embodiment of the present disclosure will now be specifically described with reference to the drawings. Like reference signs in the drawings designate objects having like names.

[Core]

A core 1 according to the embodiment will be described with reference to FIG. 1 to FIG. 6B.

Figure 4:
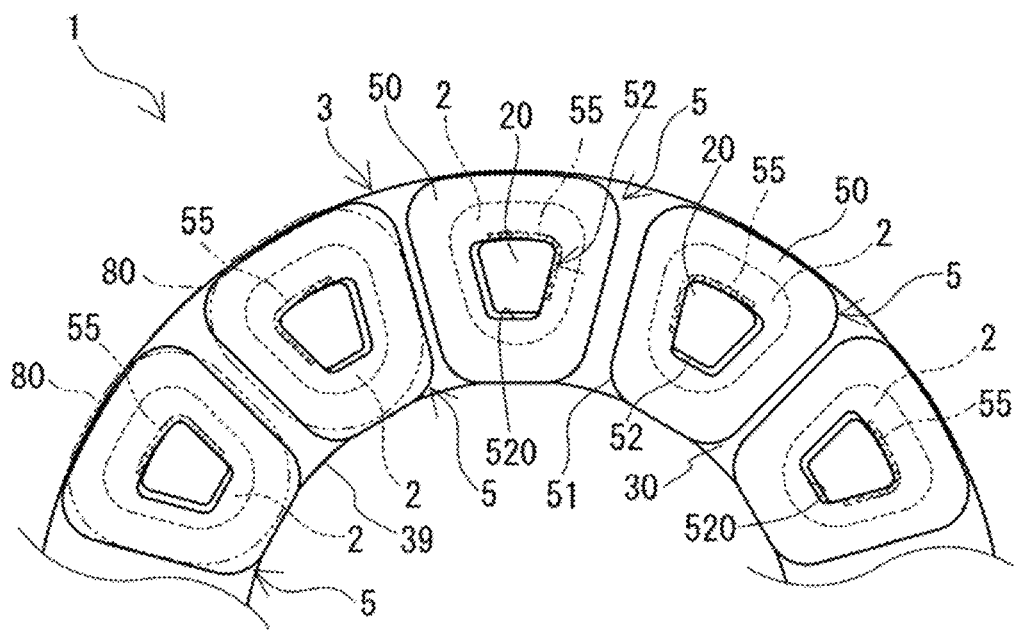
FIG. 4 is a schematic plan view illustrating a part of the core according to the embodiment in an example in which adjacent flange portions have proximity regions that face each other.
Figure 5:
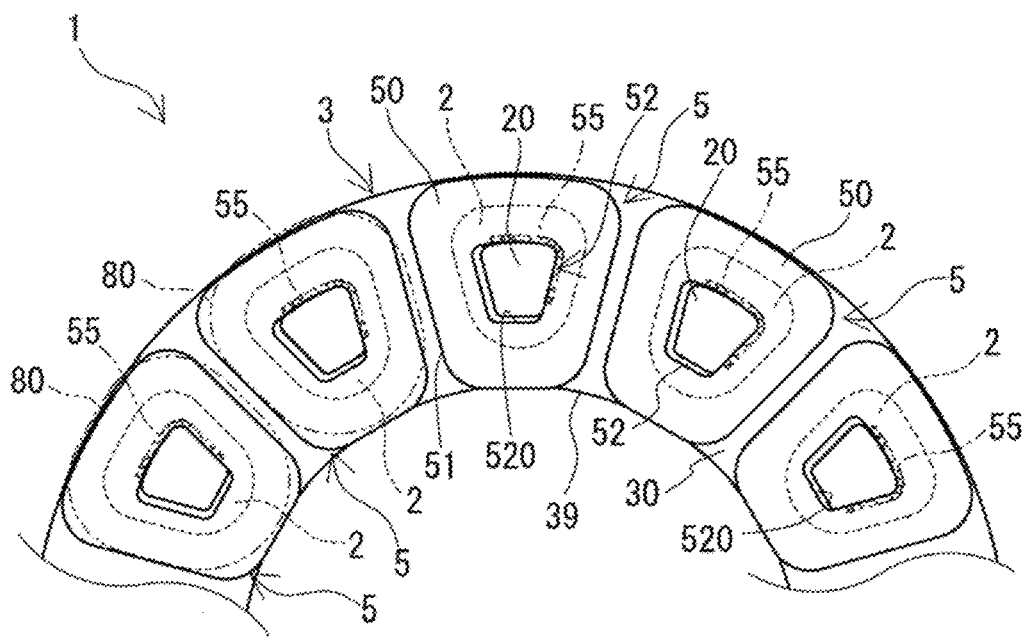
FIG. 5 is a schematic plan view illustrating a part of the core according to the embodiment in an example in which adjacent flange portions have proximity regions on the same side in the circumferential direction of a yoke.

FIG. 1, FIG. 4, FIG. 5, and FIG. 7 described later are plan views illustrating the core 1 according to the embodiment in the axial direction of a yoke 3. Each figure illustrates a surface of front and back surfaces of the yoke 3 on which teeth 2 are disposed, here a surface 30, in a plan view. FIG. 4 and FIG. 5 illustrate only a part of the core 1.

Figure 2:
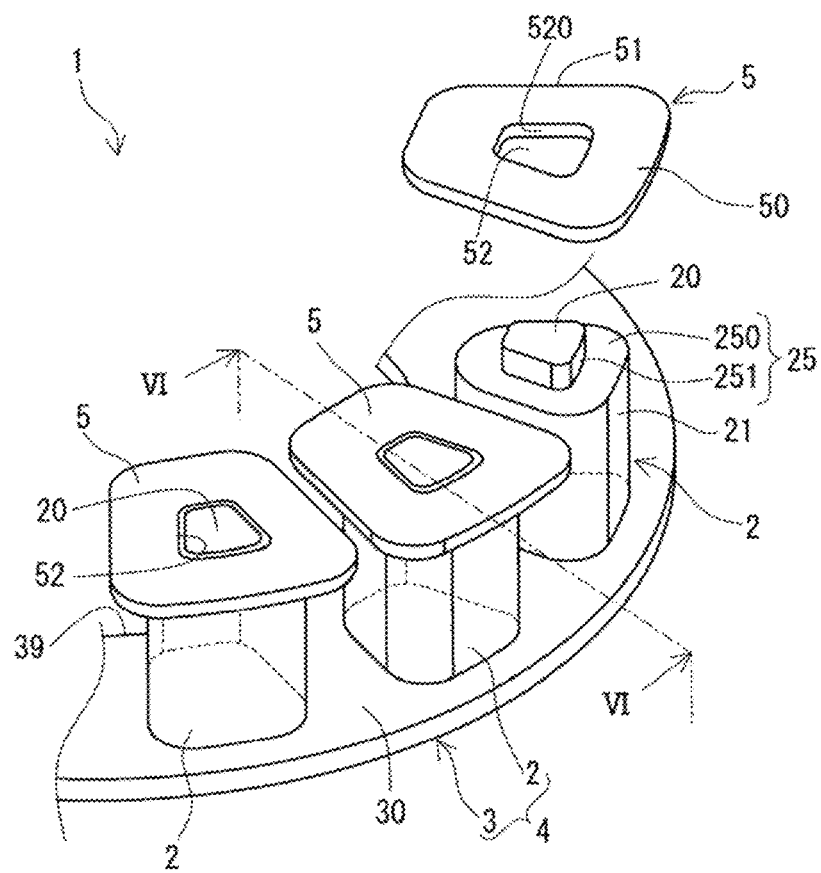
FIG. 2 is a schematic perspective view illustrating a part of the core in the example of the core according to the embodiment.

FIG. 2 is a perspective view illustrating a part of the core 1 according to the embodiment and illustrates a state of a pair of the tooth 2 and a flange portion 5 before the flange portion 5 is fixed to the tooth 2 where the tooth 2 and the flange portion 5 are disassembled.

Figure 3:
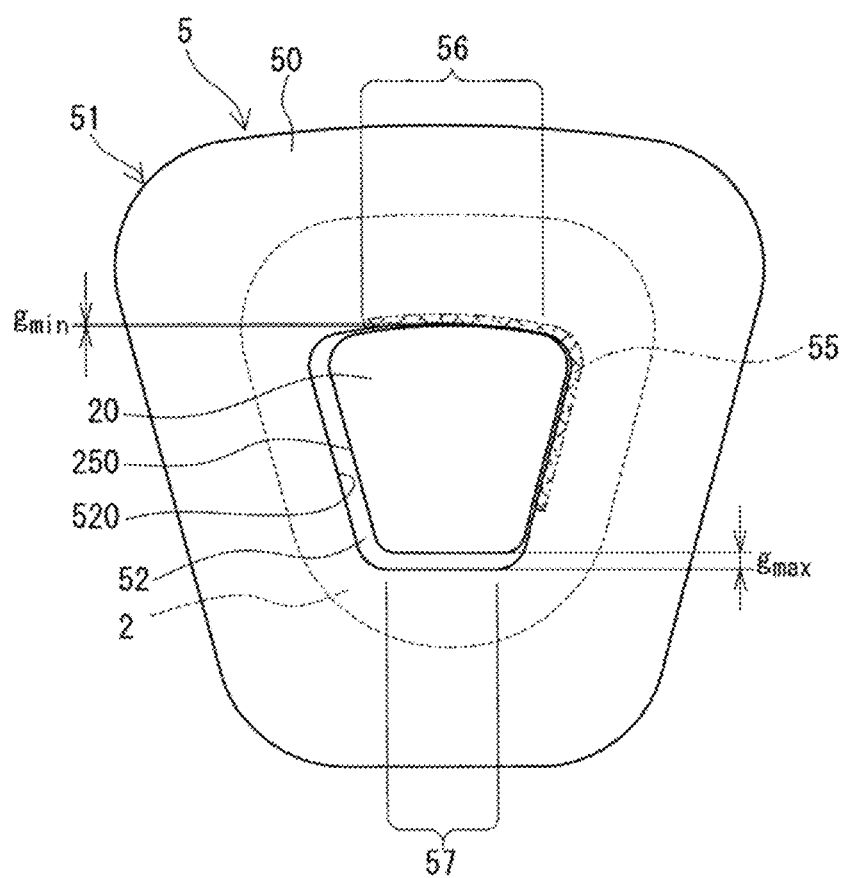
FIG. 3 illustrates a distance between an outer circumferential surface of an end portion of a tooth and an inner circumferential surface around a through-hole of a flange portion in the core according to the embodiment.

FIG. 3 is a plan view of a pair of the tooth 2 and the flange portion 5 and illustrates an end surface 20 of the tooth 2 and an end surface 50 of the flange portion 5 in the axial direction of the tooth 2 in a plan view.

Figure 6A:
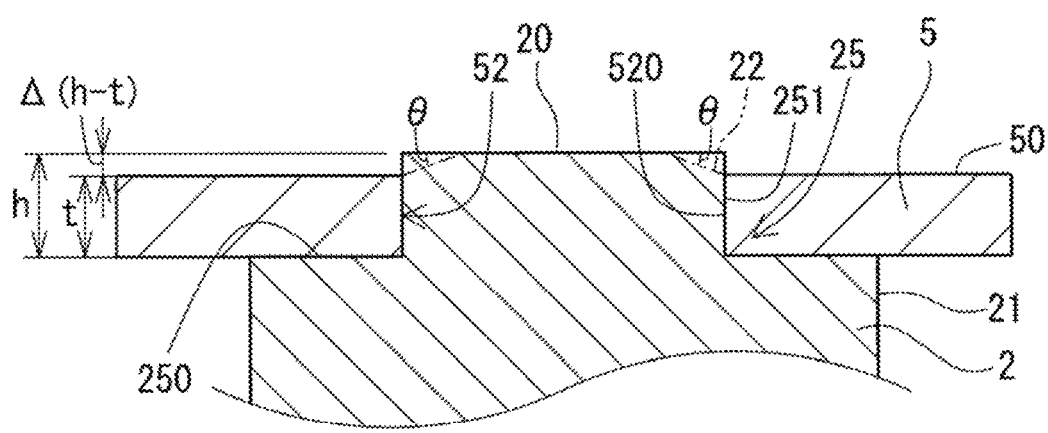
FIG. 6A is a partial sectional view illustrating a part of a tooth that includes a step portion in the core according to the embodiment.
Figure 6B:
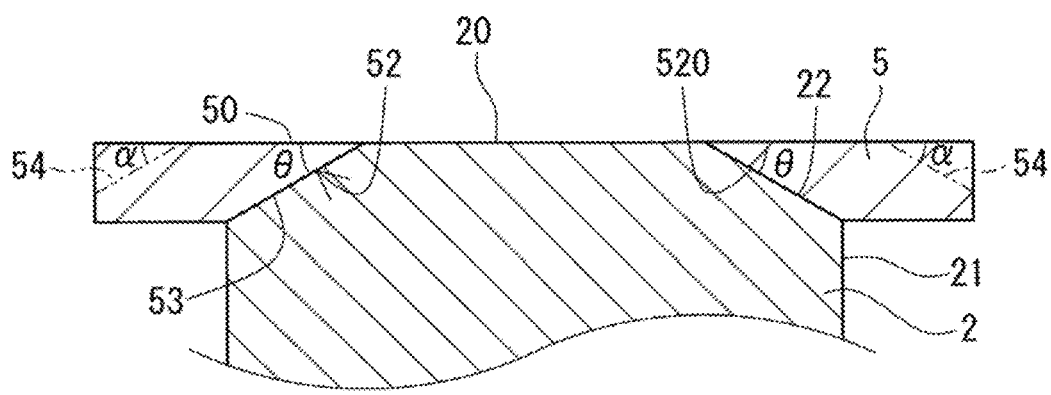
FIG. 6B is a partial sectional view illustrating a part of a tooth that includes an inclined surface in the core according to the embodiment.

FIG. 6A and FIG. 6B are sectional views of the core 1 according to the embodiment taken along a plane parallel to the axial direction of the teeth 2 and illustrate only end portions of the teeth 2, the vicinity thereof, and the flange portions 5. The sectional views in FIG. 6A and FIG. 6B correspond to sectional views of the core 1 taken along line VI-VI illustrated in FIG. 2.

In FIG. 1 to FIG. 6B, and FIG. 7 and FIG. 8 described later, scales are appropriately changed for convenience of description.

SUMMARY

A summary of the core 1 will now be described mainly with reference to FIG. 1 and FIG. 2.

The core 1 according to the embodiment includes the annular yoke 3, the columnar teeth 2, and the flange portions 5 having a plate shape. The flange portions 5 are disposed on the end portions of the respective teeth 2. The core 1 is used in an axial-gap rotary electric machine. Representatively, the core 1 can be used as a core of a stator. An example of the axial-gap rotary electric machine is a rotary electric machine 9 illustrated in FIG. 8 described later. An example of the stator is a stator 8 illustrated in FIG. 7 described later. The core 1 in which coils 80 (FIG. 7 and FIG. 8) are disposed on the respective teeth 2 is used as a component of a magnetic circuit through which magnetic flux that is produced by the coils 80 and magnetic flux that is produced by magnets 95 (FIG. 8) pass.

As for the core 1 according to the embodiment, the yoke 3 and the teeth 2 are integrally formed into a single piece, and the flange portions 5 are members separated from the single piece described above. The flange portions 5 are frame-shaped members that have through-holes 52. The end surfaces 20 of the teeth 2 are exposed from the through-holes 52. In particular, as for the core 1 according to the embodiment, the ratio of the area of the end surface 20 of each tooth 2 to an area within an outer circumferential edge 51 of each flange portion 5 in a plan view in the axial direction of the yoke 3, that is, an exposed area ratio is 7.5% or more.

The detail will now be described.

<Body>

The core 1 according to the embodiment includes a body 4. The body 4 includes the yoke 3 and the teeth 2 that are arranged in the circumferential direction of the yoke 3. In the body 4, the yoke 3 and the teeth 2 are composed of a single powder compact. The core 1 is a combination of the single body 4 and the flange portions 5, and the yoke 3 and the teeth 2 are integrally formed into the single piece. For this reason, there are no spaces that can be the magnetic gaps between the yoke 3 and the teeth 2. Accordingly, the core 1 allows the magnetic flux to successfully pass through the yoke 3 from the teeth 2 unlike a core in which the yoke 3 and the teeth 2 are separated members.

<<Yoke>>

The yoke 3 is a plate member a planar shape of which is annular. A surface of the front and back surfaces of the yoke 3, here the surface 30, is a surface from which the teeth 2 extend. The yoke 3 magnetically couples the adjacent teeth 2 with each other among the teeth 2 that are arranged in the circumferential direction of the yoke 3. The yoke 3 has an axial hole 39 at a central portion thereof. The axial hole 39 extends through the yoke 3 between the front and back surfaces.

<<Tooth>>

Each tooth 2 is a columnar member and extends so as to be perpendicular to the surface 30 of the yoke 3. The teeth 2 are arranged in a predetermined interval in the circumferential direction of the yoke 3. Representatively, as illustrated by way of example in FIG. 1, the teeth 2 are arranged in a regular interval in the circumferential direction of the yoke 3. The direction perpendicular to the surface 30 of the yoke 3 corresponds to the direction parallel to the axial direction of the axial hole 39 of the yoke 3. The axial direction of the teeth 2 corresponds to the direction parallel to the axial direction of the yoke 3. In FIG. 1, the axial direction of the yoke 3 corresponds to the direction perpendicular to the paper.

Representatively, the teeth 2 have the same shape and the same size.

Representatively, the external shape of each tooth 2 is a prismatic shape in which a sectional shape taken along a plane perpendicular to the axial direction of the tooth 2 is uniform in the axial direction of the tooth 2. In this example, the tooth 2 has a quadrangular prism shape in which the sectional shape described above is a trapezoidal shape. In this example, the tooth 2 has a sectional shape uniform in the axial direction of the tooth 2 except for the end portion to which the flange portion 5 is fixed. The tooth 2 having the shape in which the sectional shape described above is a trapezoidal shape readily ensures a large sectional area. The dead space of the core 1 is readily decreased. Consequently, the stator 8 that has a high space factor is readily constructed. Another example of the external shape is a prismatic shape in which the sectional shape described above is a triangular shape such as an isosceles triangle shape. Other examples of the external shape include a rectangular cuboid shape in which the sectional shape described above is a rectangular shape and a columnar shape in which the sectional shape described above is a circular shape.

The range of the "trapezoidal shape" and the range of the "triangular shape" described herein include not only a trapezoid and a triangle in a geometrical sense but also shapes that can be substantially regarded as a trapezoid and a triangle including a shape having a rounded corner portion as in this example. For example, in the case where the contour of a section includes a straight line, the ranges described above include a shape in which an intersection point of an extension line of the straight line coincides with a vertex of a polygon. For example, in the case where the contour of a section includes a curved line and a straight line, the ranges described above include a shape in which an intersection point between the tangent of the curved line and the straight line, or an extension line of the straight line coincides with a vertex of a polygon.

The number of the teeth 2 can be appropriately selected provided that the number is 2 or more. The number described above may be, for example, 3 or more, or may be 6 or more. FIG. 1 illustrates, by way of example, the body 4 where the number described above is 12.

Figure 7:
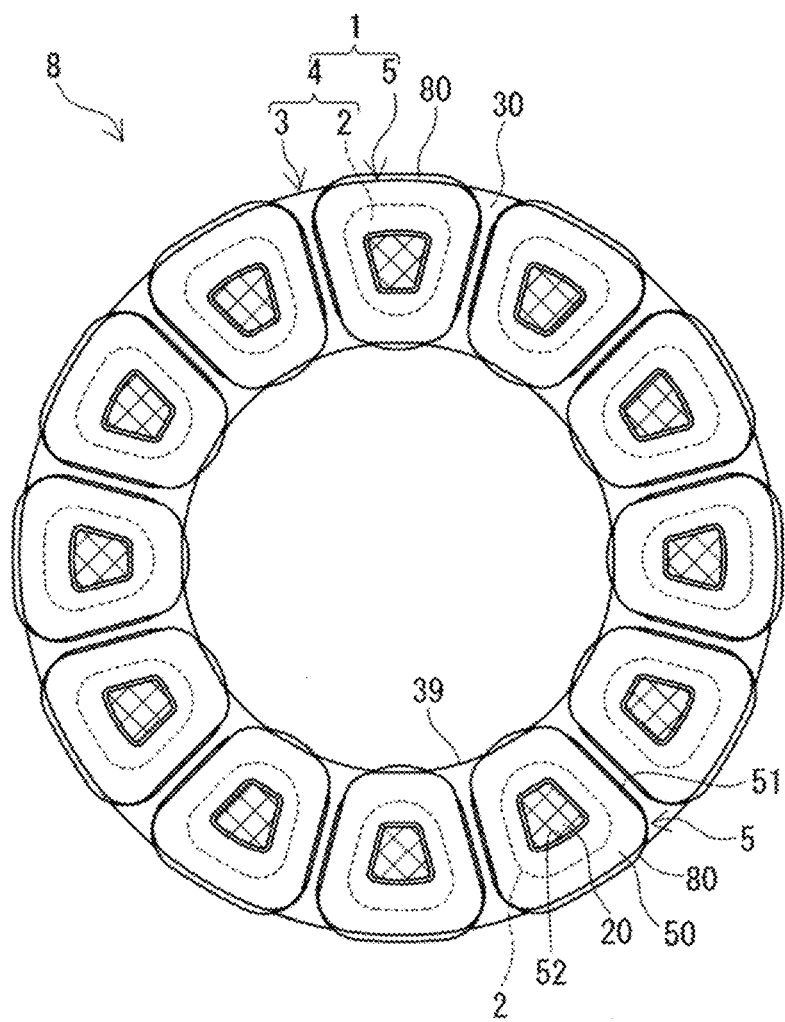
FIG. 7 is a schematic plan view illustrating an example of a stator according to the embodiment.

The flange portions 5 are fixed to the end portions of the respective teeth 2 opposite ends coupled with the yoke 3. That is, one of the end portions of each tooth 2 corresponds to a portion coupled with the yoke 3. The other end portion of the tooth 2 corresponds a portion fixed to the flange portion 5. The end surface 20 of the tooth 2 is exposed from the flange portion 5 with the flange portion 5 fixed. In FIG. 1 and FIG. 7 described later, the end surface 20 is illustrated by hatching to make this easy to see.

The shape of the end surface 20 is similar to the shape of a circumferential surface 21 (FIG. 2) of a portion of each tooth 2 except for the end portion or is substantially similar thereto as in this example. The portion of the tooth 2 except for the end portion is referred to below as an intermediate portion. In the case where the rotary electric machine 9 is constructed by using the core 1, the magnetic flux of the magnet 95 readily passes from the end surface 20 at a freely selected position in the circumferential direction of the tooth 2. Representatively, the end surface 20 is a flat surface parallel to the surface 30 of the yoke 3 and is perpendicular to the magnetic flux as in this example. Representatively, the circumferential surface 21 is perpendicular to the surface 30 of the yoke 3 as in this example.

Other than these, the shape of the end surface 20 may be a shape dissimilar to the shape of the circumferential surface 21 of the intermediate portion of each tooth 2. For example, when the shape of the circumferential surface 21 of the intermediate portion of the tooth 2 is a trapezoidal shape, the shape of the end surface 20 may be a circular shape or a triangular shape. From the perspective that the magnetic flux passes, however, the shape of the end surface 20 is preferably a shape similar or substantially similar to the shape of the circumferential surface 21 as described above.

Each tooth 2 may include a step portion 25 at the end portion (FIG. 2). The flange portion 5 is placed on the step portion 25. The end portion of the tooth 2 will be described in detail together with, for example, the size of the end surface 20 and the shape of the step portion 25 in a section of <Relationship between Tooth and Flange Portion>.

<<Size>>

The size of the yoke 3 and the size of each tooth 2 can be appropriately selected depending on the rotary electric machine 9.

Examples of the size of the yoke 3 include an outer diameter, an inner diameter, and a thickness. The outer diameter of the yoke 3 is, for example, no less than 30 mm and no more than 300 mm. The inner diameter of the yoke 3, here the diameter of the axial hole 39, is, for example, no less than 5 mm and no more than 150 mm. The thickness of the yoke 3 is, for example, no less than 1.0 mm and no more than 10 mm, furthermore, no less than 1.5 mm and no more than 7.0 mm.

Examples of the size of each tooth 2 include a sectional area and a height. The sectional area of the tooth 2 is the area of a section taken along a plane perpendicular to the axial direction of the tooth 2. In the case where the tooth 2 includes the step portion 25, the sectional area is a sectional area of the intermediate portion except for the end portion described above. The height of the tooth 2 is equal to a distance from the surface 30 of the yoke 3 to the end surface 20. The sectional area of the tooth 2 is, for example, no less than 5 mm$^2$ and no more than 800 mm$^2$. The height of the tooth 2 is, for example, no less than 3 mm and no more than 40 mm.

<Flange Portion>

Each flange portion 5 is a frame-shaped plate member that is fixed to the end portion of the tooth 2. The flange portion 5 is composed of a powder compact that has the through-hole 52. The end portion of the tooth 2 is inserted in the through-hole 52. Representatively, the flange portions 5 have the same shape and the same size.

<<Function and Effect>>

The flange portions 5 have a function of causing an increased amount of the magnetic flux to pass through the teeth 2 as described below. The flange portions 5 protrude from the circumferential surfaces 21 of the teeth 2 in the direction perpendicular to the circumferential surfaces 21 with the flange portions 5 fixed to the end portions of the teeth 2. For this reason, the area of a flat surface on the end portion of each tooth 2 to which the flange portion 5 is fixed is equal to the total area of the area of the end surface 20 and the area of the end surface 50 of the flange portion 5. Accordingly, it can be said that the area of the flat surface on the end portion of each tooth 2 to which the flange portion 5 is fixed is larger than the sectional area of the intermediate portion of the tooth 2 because of the flange portion 5. In the case where the rotary electric machine 9 is constructed by using the core 1, the area of the core 1 that faces the magnets 95 is larger than that in the case where there are no flange portions. For this reason, the core 1 readily collects the magnetic flux of the magnets 95 to the teeth 2 by using the flange portions 5, and an increased amount of the magnetic flux described above readily passes.

The core 1 includes the flange portions 5 but enables the stator 8 and the rotary electric machine 9 to have excellent manufacturability as described below. The core 1 is the combination in which the body 4 that includes the teeth 2 and the flange portions 5 are separatable. For this reason, the coils 80 can be disposed on the teeth 2 with no flange portions 5 disposed on the ends of the teeth 2 while the stator 8 and the rotary electric machine 9 are manufactured. Accordingly, the core 1 and the coils 80 are readily assembled. The teeth 2 on which the coils 80 are disposed and the flange portions 5 are integrated. For example, the end portions of the teeth 2 described above are inserted into the through-holes 52 of the flange portions 5, and the teeth 2 and the flange portions 5 are joined to each other with, for example, an adhesive or are fixed to each other by, for example, press-fitting or shrink-fitting. During the shrink-fitting, for example, the flange portions 5 can be heated to an appropriate temperature. The teeth 2 and the flange portions 5 are thus fixed to each other, and consequently, the body 4 and the flange portions 5 are integrated.

The flange portions 5 have, for example, another function of preventing the coils 80 from falling from the teeth 2. The core 1 includes the flange portions 5 but can inhibit cogging torque from increasing as described below. There can be spaces between the outer circumferential surfaces of the end portions of the teeth 2 and inner circumferential surfaces 520 (FIG. 2) that define the through-holes 52 of the flange portions 5. However, the core 1 can use the spaces as the magnetic gaps. The magnetic gaps increase magnetic resistance between the flange portions 5 and the teeth 2. In the case where the rotary electric machine 9 is constructed by using the core 1, changes in the magnetic flux due to rotation of the magnets 95 are readily decreased. In the figures, the spaces described above are enlarged to make these easy to see.

<<Shape>>

The shape of the outer circumference of each flange portion 5, that is, a shape that the outer circumferential edge 51 draws is similar to the shape of the circumferential surface 21 of the intermediate portion of each tooth 2 or is substantially similar thereto as in this example. In this case, the flange portion 5 enables the magnetic flux of the magnet 95 to readily pass at a freely selected position in the circumferential direction of the tooth 2, which is a positive effect.

The shape of the inner circumference of each flange portion 5, that is, a shape that the inner circumferential surface 520 around the through-hole 52 draws is similar to the shape of the outer circumference of the flange portion 5 as in this example. In this case, a distance between the outer circumferential edge 51 and the inner circumferential surface 520 of the flange portion 5, that is, a width is likely to be uniform in the circumferential direction of the flange portion 5. For this reason, the flange portions 5 uniformly exert the effect of enabling the magnetic flux of the magnets 95 to readily pass at freely selected positions in the circumferential direction of the teeth 2. The shape of the inner circumference of each flange portion 5 may be dissimilar to the shape of the outer circumference of the flange portion 5 but is preferably similar or substantially similar to the shape as described above from the perspective that the magnetic flux passes.

The shape of the inner circumference of each flange portion 5 is also similar to the shape of the end surface 20 of the tooth 2 as in this example. In this case, the space between the inner circumferential surface 520 of the flange portion 5 and the outer circumferential surface of the end portion of the tooth 2 is readily prevented from locally increasing. A space that locally expands becomes a large magnetic gap. In the case where there is the large magnetic gap between the inner circumferential surface 520 of the flange portion 5 and the outer circumferential surface of the end portion of the tooth 2, the torque decreases. The torque is inhibited from decreasing by decreasing the large magnetic gap described above.

The shape of the outer circumference and the shape of the inner circumference of each flange portion 5 in this example are trapezoidal shapes having rounded corner portions. A long side portion of the trapezoid in the contour of the flange portion 5 is located near the outer circumferential edge of the yoke 3 with the flange portion 5 fixed to the tooth 2. A short side portion of the trapezoid described above is located near the inner circumferential edge of the yoke 3. Representatively, the end surface 50 and the opposite surface are flat surfaces as in this example.

<Relationship between Tooth and Flange Portion>

The end portions of the teeth 2 and the through-holes 52 of the flange portions 5 will now be described in detail mainly with reference to FIG. 3 to FIG. 6B.

<<Exposed Area Ratio>>

In the core 1 according to the embodiment, a part of each tooth 2, specifically, the end surface 20 of the end portion is exposed from the through-hole 52 of the flange portion 5. For this reason, the magnetic gap extending in the direction perpendicular to the magnetic flux between the flange portion 5 and the tooth 2 is readily decreased. The magnetic gap is referred to below as a perpendicular gap. As for the core 1, the size of the perpendicular gap described above is smaller than the sectional area of the intermediate portion of the tooth 2. In some cases, the core 1 does not substantially have the perpendicular gap described above. The core 1 enables the magnetic flux of the magnets 95 (FIG. 8) to readily pass through the teeth 2 from the flange portions 5 because each perpendicular gap is small. For this reason, although the teeth 2 and the flange portions 5 are separated members, the core 1 can inhibit the torque from decreasing due to the magnetic gaps located therebetween. For this point, samples No. 101 and No. 1 in a test example 1 described later, for example, are preferably referred.

Quantitatively, the ratio of the area $S_2$ of the end surface 20 of each tooth 2 that is exposed from the through-hole 52 to an area $S_5$ within the outer circumferential edge 51 of the flange portion 5, that is, the exposed area ratio is 7.5% or more. The exposed area ratio (%) is obtained as $(S_2/S_5) \times 100$. The area $S_5$ of the flange portion 5 described above includes the area of the through-hole 52.

When the exposed area ratio described above is 7.5% or more, the end surfaces 20 of the teeth 2 can directly receive the magnetic flux of the magnets 95. When the exposed area ratio described above is 7.5% or more, the perpendicular gaps described above are readily decreased. For this reason, the magnetic flux of the magnets 95 readily passes through the teeth 2 from the flange portions 5. Accordingly, the core 1 readily inhibits the torque from decreasing and enables the rotary electric machine 9 having high torque to be constructed.

The higher the exposed area ratio described above, the more the torque is readily inhibited from decreasing. In the case where the torque is to be further inhibited from decreasing, the exposed area ratio described above is preferably 8.0% or more, furthermore 10% or more. For this point, a test example 2 described later is preferably referred.

When the exposed area ratio described above is, for example, 90% or less, the width of each flange portion 5 can be increased to a certain extent. For this reason, the effect of increasing the amount of the magnetic flux that passes because of the flange portions 5 and the effect of preventing the coils 80 from falling, for example, are readily exerted. In the case where the width of each flange portion 5 is increased to a certain extent, the following effects are expected: the flange portion 5 is readily compacted, the flange portion 5 has excellent manufacturability, the flange portion 5 is readily handled, and the workability of assembly of the tooth 2 and the flange portion 5 is excellent. In the case where the effects described above are to be exerted, the exposed area ratio described above may be 80% or less, furthermore, 70% or less, 60% or less, less than 60%.

<<Distance between Proximity Region and Tooth>>

Representatively, the size of the through-hole 52 of each flange portion 5 is designed to be larger than the size of the end portion of the tooth 2 such that insertion work for the tooth 2 is readily carried out, and a margin is left. Consequently, there is the space between the outer circumferential surface of the end portion of the tooth 2 and the inner circumferential surface 520 around the through-hole 52. The space becomes the magnetic gap and causes a decrease in the torque. The present inventors have acquired knowledge that the torque can be inhibited from decreasing when the space described above is very small at least at a region in the circumferential direction of the through-hole 52. The reason is presumably that the magnetic flux of the magnets 95 readily passes through the teeth 2 from regions of the flange portions 5 in which the distance described above is short. In view of this, each flange portion 5 preferably has a region in which the distance between the outer circumferential surface of the end portion of the tooth 2 and the inner circumferential surface 520 around the through-hole 52 of the flange portion 5 is 0.05 mm or less. The distance between the outer circumferential surface of the end portion of the tooth 2 and the inner circumferential surface 520 around the through-hole 52 of the flange portion 5 is equal to the minimum length of a straight line that connects a point on the outer circumferential surface of the end portion of the tooth 2 and a point on the inner circumferential surface 520 around the through-hole 52 of the flange portion 5. The region of the flange portion 5 in which the distance described above is 0.05 mm or less is referred to below as a proximity region 55. FIG. 3 to FIG. 5 virtually illustrate the proximity region 55 by crosshatching of a two-dot chain line to a part of a region of the through-hole 52 near the inner circumferential surface 520.

The distance between the end portion of each tooth 2 and the proximity region 55 of the flange portion 5 is 0.05 mm or less and is very short. It can be said that the proximity region 55 of the flange portion 5 is substantially in contact with the end portion of the tooth 2. When the distance between the end portion of the tooth 2 and the proximity region 55 of the flange portion 5 is 0.05 mm or less, it can be said that the space between the end portion of the tooth 2 and the proximity region 55 of the flange portion 5 is unlikely to be the magnetic gap. In the case where the rotary electric machine 9 is constructed by using the core 1, the proximity regions 55 of the flange portions 5 enable the magnetic flux of the magnets 95 to readily pass through the teeth 2. For this reason, the rotary electric machine 9 more readily inhibits the torque from decreasing and readily has high torque.

The shorter the distances between the end portions of the teeth 2 and the proximity regions 55 of the flange portions 5, the more the magnetic flux of the magnets 95 readily passes through the teeth 2 by means of the proximity regions 55, and the more the torque is readily inhibited from decreasing. In the case where the torque is to be further inhibited from decreasing, each distance described above is preferably 0.04 mm or less, furthermore, 0.03 mm or less, 0.02 mm or less. The core 1 may have a portion at which the distance described above is substantially 0 mm. For example, the use of, for example, the press-fitting described above for securing the teeth 2 and the flange portions 5 to each other enables the flange portions 5 to readily increase the length of the portion at which the distance described above is 0 mm.

<<Joining Ratio>>

It is more preferable that the proximity region 55 of each flange portion 5 increases. Quantitatively, the ratio of the length $L_{55}$ of the proximity region 55 in the circumferential direction of the through-hole 52 to the circumferential length $L_5$ of the through-hole 52 of the flange portion 5 is more than 20%. The ratio of the length $L_{55}$ to the circumferential length $L_5$ described above is referred to below as a joining ratio. The joining ratio (%) described above is obtained as $(L_{55}/L_5) \times 100$.

When the joining ratio described above is more than 20%, it can be said that the proximity region 55 of each flange portion 5 is long. For this reason, the magnetic flux of the magnets 95 readily passes through the teeth 2 by means of the proximity regions 55. Consequently, the torque is more readily inhibited from decreasing. In the case where the torque is to be further inhibited from decreasing, the joining ratio described above is preferably 25% or more, furthermore 30% or more, 35% or more.

The joining ratio described above is preferably increased so as to be 100% or less. When the joining ratio described above is, for example, 70% or less, a large margin for the insertion work described above can be ensured. Consequently, the teeth 2 and the flange portions 5 are readily assembled. In the case where the workability of assembly is to be improved, the joining ratio described above may be 65% or less, furthermore 60%.

<<Maximum Difference in Distance>>

In some cases where each flange portion 5 has the proximity region 55, the distance between the outer circumferential surface of the end portion of each tooth 2 and the inner circumferential surface 520 around the through-hole 52 of the flange portion 5 is relatively long at a position. Also, in this case, the difference between the maximum value and minimum value of the distance described above is preferably less than 0.40 mm. The difference is referred to below as the maximum difference in the distance. In an example in FIG. 3, the minimum value $g_{min}$ in the distance described above appears in the proximity region 55 on the inner circumferential surface 520 of the flange portion 5, and the maximum value $g_{max}$ in the distance described above appears on the inner circumferential surface 520 of the flange portion 5 near the inner circumferential edge of the yoke 3, at lower corner portions in FIG. 3. In the example in FIG. 3, a part of the proximity region 55 is located on the inner circumferential surface 520 of the flange portion 5 near the outer circumferential edge of the yoke 3, at an upper part in FIG. 3.

When the maximum difference in the distance described above is less than 0.40 mm, it can be said that the core 1 does not include a portion at which the distance between the outer circumferential surface of the end portion of each tooth 2 and the inner circumferential surface 520 around the through-hole 52 of the flange portion 5 locally increases. The portion at which the distance described above locally increases becomes the large magnetic gap. For this reason, when the maximum difference in the distance described above is less than 0.40 mm, the core 1 does not have the large magnetic gap, and the magnetic flux of the magnets 95 readily passes through the teeth 2 from the flange portions 5. Accordingly, the torque is readily inhibited from decreasing. As the maximum difference in the distance described above decreases, the core 1 does not have the large magnetic gap with more certainty, the magnetic flux readily passes through the teeth 2, and the torque is more readily inhibited from decreasing. In the case where the torque is to be further inhibited from decreasing, the maximum difference in the distance described above is preferably 0.35 mm or less, furthermore 0.30 mm or less.

The maximum difference in the distance described above may be 0 mm. In this case, it can be said that the distance between the outer circumferential surface of the end portion of each tooth 2 and the inner circumferential surface 520 around the through-hole 52 of the flange portion 5 is uniform in the circumferential direction of the through-hole 52. In the case where the distance described above is uniform, and the distance described above is 0.20 mm or less, furthermore 0.15 mm or less, 0.10 mm or less, the magnetic flux of the magnets 95 readily passes through the teeth 2 from the flange portions 5 in the core 1 even when the flange portions 5 does not have the proximity regions 55. For this reason, the torque is readily inhibited from decreasing. For this point, the test example 1 described later is preferably referred.

It is preferable that each flange portion 5 have the proximity region 55, and that the maximum difference in the distance described above be less than 0.40 mm. The reason is that it can be said that the proximity regions 55 enable the magnetic flux of the magnets 95 to readily pass through the teeth 2, and that regions of the flange portions 5 other than the proximity regions 55 are near the outer circumferential surface of the end portion of the tooth 2. For this reason, the magnetic flux more readily passes through the teeth 2 from the flange portions 5, and the torque is readily inhibited from decreasing. For this point, a test example 3 described later is preferably referred.

<<Position of Proximity Region>>

Each flange portion 5 has the proximity region 55 at a freely selected position in the circumferential direction of the through-hole 52. As illustrated by way of example in FIG. 3, the flange portion 5 has the proximity region 55 at least a part of which is located on a side of the flange portion 5 near the outer circumferential edge of the yoke 3. In this case, the length of the proximity region 55 is readily increased. For example, when the shape of the inner circumference of the flange portion 5 is, for example, a trapezoidal shape, and the long side portion of the trapezoid is located near the outer circumferential edge of the yoke 3, the length of an outer circumferential region 56 of the flange portion 5 near the outer circumferential edge of the yoke 3 is greater than the length of an inner circumferential region 57 of the flange portion 5 near the inner circumferential edge of the yoke 3. For this reason, in the case where at least a part of the proximity region 55 is located in the outer circumferential region 56 of the flange portion 5, the length of the proximity region 55 is readily increased. The longer the proximity region 55, the higher the joining ratio described above. Consequently, the core 1 enables the magnetic flux to more readily pass through each tooth 2 from the proximity region 55, and the torque is more readily inhibited from decreasing.

In an example in FIG. 3, there are the outer circumferential region 56 of the flange portion 5 and the proximity region 55 having an L-shape and extending over a region of the flange portion 5 in the circumferential direction of the yoke 3. Other than this case, the core 1 may have the proximity region 55 only in the outer circumferential region 56 of the flange portion 5. Alternatively, the core 1 may have the proximity region 55 only in the inner circumferential region 57 of the flange portion 5, or only in a region of the flange portion 5 in the circumferential direction of the yoke 3.

It is preferable that each flange portion 5 have the proximity region 55 at least a part of which is located in the outer circumferential region 56 of the flange portion 5, and that the joining ratio described above be 35% or more. The reason is that the magnetic flux of the magnets 95 more readily passes through the teeth 2 because of the proximity regions 55, and that the torque is more readily inhibited from decreasing. For the joining ratio, a test example 4 described later is preferably referred.

Alternatively, as illustrated by way of example in FIG. 4, the flange portions 5 that are fixed to the teeth 2 adjacent to each other in the circumferential direction of the yoke 3 have the proximity regions 55 at least parts of which are located on sides that the teeth 2 face. In this case, the proximity regions 55 of the adjacent flange portions 5 face each other. For this reason, the magnetic flux readily passes through the adjacent teeth 2 from the proximity regions 55 of the respective flange portions 5, and the torque is readily inhibited from decreasing.

In the case where the core 1 in which the adjacent flange portions 5 have the proximity regions 55 that face each other as described above is used in a polyphase alternating current rotary electric machine, the coils 80 for the same phase or coils 80 for a different phase are disposed on the respective adjacent teeth 2. In particular, in the case where the coils 80 for the same phase are disposed in the adjacent teeth 2, the torque is readily inhibited from decreasing more than the case where the coils 80 for a different phase are disposed. For this point, a test example 5 described later is preferably referred.

For example, in the case where the core 1 is used in a three-phase alternating current rotary electric machine, the following arrangement is considered. The coils 80 in U-phase are disposed on the first tooth 2 and the second tooth 2 from the left in FIG. 4. Coils in V-phase, not illustrated, are disposed on the third tooth 2 and the fourth tooth 2 from the left in FIG. 4. Coils in W-phase, not illustrated, are disposed on the fifth tooth 2 and the sixth tooth 2, not illustrated, from the left in FIG. 4. In this case, for the adjacent teeth 2 on which the coils 80 for a different phase are disposed, for example, for the second tooth 2 and the third tooth 2 from the left in FIG. 4, the proximity regions 55 are located on the sides in the directions in which the teeth 2 are separated. Two-dot chain lines in FIG. 4 virtually represent a state in which the coils 80 are disposed on the two teeth 2 on the left part on the paper. As for this point, the same is true for FIG. 5 described later.

Alternatively, as illustrated by way of example in FIG. 5, the flange portions 5 have the proximity regions 55 at least parts of which are located on the same side of the flange portions 5 in the circumferential direction of the yoke 3. In this case, the magnetic flux readily passes through the teeth 2 from the proximity regions 55 of the respective flange portions 5, and the torque is readily inhibited from decreasing. Also, in this case, the state in which the magnetic flux passes through the teeth 2 from the respective flange portions 5 is readily made uniform, the magnetic flux is unlikely to be disordered, and it can be expected that the cogging of the torque is readily decreased. Also, in this case, the state in which the flange portions 5 are fixed to the respective teeth 2 is readily made uniform. As for this point, the core 1 has excellent manufacturability. In an example in FIG. 5, parts of the proximity regions 55 are located on the right of the through-holes 52 of the flange portions 5.

In the case where the rotary electric machine 9 is constructed by using the core 1 in which the proximity regions 55 of the flange portions 5 are located on the same side in the circumferential direction of the yoke 3, the flange portions 5 may have the proximity regions 55 on the same side in the rotation direction of a rotor 90 (FIG. 9) or the opposite side in the rotation direction described above. In particular, in the case where the flange portions 5 have the proximity regions 55 on the same side in the rotation direction described above, the torque is readily inhibited from decreasing more than the case where the flange portions 5 have the proximity regions 55 on the opposite side. For this point, the test example 5 described later is preferably referred.

<<Step Portion>>

The step portions 25 will now be described mainly with reference to FIG. 6A.

In the case where each tooth 2 has the step portion 25 at the end portion, the flange portion 5 is stably disposed on the tooth 2 while the core 1 is manufactured. For this reason, as for the core 1 that includes the step portions 25, the flange portions 5 are readily disposed at predetermined positions on the teeth 2 when the teeth 2 and the flange portions 5 are fixed to each other with, for example, an adhesive or by press-fitting or shrink-fitting unlike the case where the core 1 includes no step portions 25, and the manufacturability is excellent.

Each step portion 25 has a bottom surface 250 and a circumferential surface 251. Representatively, the bottom surface 250 is a flat surface parallel to the end surface 20 (also see FIG. 2), and the surface of each flange portion 5 opposite the end surface 50 is placed thereon. Representatively, the circumferential surface 251 is a surface parallel to the circumferential surface 21 of each tooth 2. As for the step portion 25, an angle formed between the bottom surface 250 and the circumferential surface 251 is 90°. For the step portion 25, an angle formed between the inner circumferential surface 520 around the through-hole 52 of the flange portion 5 and the surface of the flange portion 5 that is placed on the bottom surface 250 of the step portion 25 of the tooth 2 is 90°. In this case, the shape of the step portion 25 and the shape of the flange portion 5 are simple, and the tooth 2 and the flange portion 5 are readily compacted with high precision. Accordingly, the core 1 has excellent manufacturability.

The height h of the step portion 25 is equal to the distance between the end surface 20 and the bottom surface 250 of each tooth 2. The thickness t of each flange portion 5 is equal to the distance between the end surface 50 and the opposite surface of the flange portion 5. For example, the height h of the step portion 25 is equal to the thickness t of the flange portion 5. In this case, representatively, an angle formed between the end surface 20 of the tooth 2 and the circumferential surface 251 of the step portion 25 is 90°. In this case, as illustrated by way of example in FIG. 2, the end surface 20 of the tooth 2 and the end surface 50 of the flange portion 5 are flush with each other with the tooth 2 and the flange portion 5 fixed to each other. In the case where the stator 8 and the rotary electric machine 9 are constructed by using the core 1, the distance between the stator 8 and the rotor 90 is readily adjusted.

Alternatively, for example, the height h of the step portion 25 is greater than the thickness t of each flange portion 5. In this case, as illustrated by way of example in FIG. 6A, the end surface 20 of each tooth 2 and the vicinity thereof protrude from the end surface 50 of the flange portion 5 with the tooth 2 and the flange portion 5 fixed to each other. In the case where a part of the tooth 2 thus protrudes from the flange portion 5, the cogging torque is more readily decreased as the height of the protruding part of the tooth 2 increases, that is, as the height h increases, and a difference Δ(h−t) between the height h and the thickness t increases. When the difference Δ(h−t) described above is too large, the torque is likely to decrease.

Quantitatively, the difference Δ(h−t) between the height h of the step portion 25 of each tooth 2 and the thickness t of the flange portion 5 is more than 0 mm and no more than 3 mm. When the difference Δ(h−t) described above is more than 0 mm, the cogging torque is readily decreased. In the case where the cogging torque is to be further decreased, the difference Δ(h−t) described above may be 0.5 mm or more, furthermore 1.0 mm or more. When the difference Δ(h−t) described above is 3 mm or less, the cogging torque is decreased, and the torque is inhibited from decreasing. In the case where the torque is to be further inhibited from decreasing, Δ(h−t) described above may be 2.5 mm or less, furthermore 2.0 mm or less. For this point, a test example 6 described later is preferably referred.

In the case where a part of the end portion of each tooth 2 protrudes from the flange portion 5 as described above, the corner portions of the end surface 20 of the tooth 2 may have a shape obtained by flattening. Specifically, the end portion of the tooth 2 has an inclined surface 22 that intersects the end surface 20 of the tooth 2. In the case where there is the inclined surface 22, the cogging torque is readily decreased more than the case where the corner portions of the end surface 20 described above have right angles. The reason is that the teeth 2 readily receive the magnetic flux of the magnets 95, and rapid changes in the magnetic flux are decreased. In the case where there is the inclined surface 22, the corner portions of the end surface 20 of each tooth 2 are unlikely to, for example, chip, and the tooth 2 is excellent also in strength. A two-dot chain line in FIG. 6A virtually represents the inclined surface 22.

An angle θ formed between the inclined surface 22 of each tooth 2 and an extension surface from the end surface 20 is no less than 5° and no more than 60°. When the angle θ described above is 5° or more, the cogging torque is readily decreased. In the case where the cogging torque is to be further decreased, the angle θ described above may be 10° or more, furthermore 20° or more, 30° or more. When the angle θ described above is 60° or less, the height of the protruding part of the tooth 2 from the flange portion 5 is readily decreased, and the torque is readily inhibited from decreasing. In the case where the torque is to be further inhibited from decreasing, the angle θ described above may be 55° or less, furthermore 50° or less.

When the corner portions of each flange portion 5 have a shape obtained by flattening, that is, there are inclined surfaces 54 that are virtually represented by two-dot chain lines in FIG. 6B, the cogging torque is readily decreased for the same reason as described above. In addition, the corner portions of the flange portion 5 are unlikely to, for example, chip, and the flange portion 5 is excellent also in strength. An angle α formed between each inclined surface 54 of the flange portion 5 and an extension surface from the end surface 50 is no less than 5° and no more than 60°. When the angle α described above is in this range, the cogging torque is decreased, and the torque is inhibited from decreasing as described above.

Each tooth 2 may not include the step portion 25. In this case, for example, the outer circumferential surface of the end portion of the tooth 2 and the inner circumferential surface 520 around the through-hole 52 of the flange portion 5 may be fixed to each other with, for example, an adhesive or may be fixed to each other by, for example, press-fitting. In the case where the core 1 includes no step portions 25, the perpendicular gaps between the teeth 2 and the flange portions 5 described above can be decreased by the maximum amount, and the torque is more readily inhibited from decreasing. In the case where the teeth 2 includes no step portions 25, it is difficult to fix the teeth 2 and the flange portions 5 to each other unlike the case where there are the step portions 25. In view of this, as illustrated by way of example in FIG. 6B, the inner circumferential surface 520 around the through-hole 52 of each flange portion 5 includes an inclined surface 53 facing the inclined surface 22 of the tooth 2. In this case, the inclined surface 53 of the flange portion 5 is supported by the inclined surface 22 of the tooth 2. In this case, the core 1 has excellent manufacturability because the end portion of each tooth 2 can stably support the flange portion 5 even when there are no step portions 25.

In an example in FIG. 6B, the end surface 20 of the tooth 2 and the end surface 50 of the flange portion 5 are flush with each other. However, the end surface 20 of the tooth 2 and the vicinity thereof may protrude from the end surface 50 of the flange portion 5. In this case, the length of the part of the tooth 2 that protrudes from the end surface 50 of the flange portion 5 is preferably more than 0 mm and no more than 3 mm.

<Material>

The material of the core 1 contains a soft magnetic material. Representatively, the core 1 is mainly composed of the soft magnetic material. Examples of the soft magnetic material include pure iron and an iron-based alloy.

The pure iron described herein is pure iron the purity of which is 99% or more, that is, pure iron containing a 99 mass percent or more Fe (iron). The pure iron exerts effects: high saturation flux density, excellent compacting ability, and easy densification due to compression and compacting. For this reason, in the case where the core 1 contains the pure iron, the core 1 has high saturation flux density, the core 1 has high relative density and is dense, and the core 1 is readily compacted during manufacture and has excellent manufacturability. When the core 1 is dense, the saturation flux density is readily increased, and the core 1 is excellent in mechanical characteristics such as the strength.

The iron-based alloy described herein contains additional elements, and the rest is composed of Fe and inevitable impurities. The iron-based alloy contains a kind of or two or more kinds of additional elements. Examples of the additional elements include Si (silicon), Al (aluminum), and Cr (chromium). Specific examples of the iron-based alloy include a Fe—Si-based alloy, which is an iron-based alloy containing Si, an Fe—Al-based alloy, which is an iron-based alloy containing Al, and an iron-based alloy containing Cr in addition to Si or Al. The electric resistance of the iron-based alloy is larger than that in the pure iron. For this reason, the core 1 can reduce iron loss such as eddy current loss when containing the iron-based alloy and readily has low loss. The core 1 may contain both of the pure iron and the iron-based alloy.

The powder compact of which the body 4 is composed and the powder compact of which each flange portion 5 is composed are aggregates of powder particles of the soft magnetic material. The powder compacts described above maintain a predetermined shape mainly with the powder particles described above engaging with each other due to plastic deformation. Representatively, the powder compacts can be manufactured by compressing and compacting material powder containing the powder of the soft magnetic material by using a mold, not illustrated.

Soft magnetic powder may contain coating particles obtained by forming insulating coatings on the surfaces of powder particles of the soft magnetic material. The core 1 can reduce the iron loss such as the eddy current loss when containing the coating particles and readily has low loss. In particular, the core 1 has high saturation flux density, has excellent magnetic characteristics, and readily has low loss when containing the powder particles of the pure iron and the coating particles including the insulating coatings. Examples of the material of the insulating coatings include oxides such as phosphate and silica. Phosphate has excellent adhesion with the powder particles of iron or the iron-based alloy and excellent deformability. For this reason, the insulating coatings composed of phosphate readily deform so as to follow the deformation of the iron-based powder particles described above and are unlikely to be damaged during compacting. Accordingly, the powder compact containing the robust insulating coatings is manufactured. The core 1 readily has low loss when containing the powder compacts as above.

<Relative Density>

When the core 1 has a high relative density and is dense, the core 1 is excellent in magnetic characteristics such as the saturation flux density and mechanical properties such as the strength, which is preferable. Quantitatively, the relative density of the body 4 and the relative density of the flange portions 5 are preferably 90% or more. When the relative density described above is 90% or more, the core 1 has high saturation flux density and has excellent strength. For example, when the flange portions 5 are disposed on the teeth 2, the teeth 2 and the flange portions 5 are prevented from, for example, chipping. For example, in the case where the magnetic characteristics and the mechanical properties are to be improved, the relative density described above is preferably 93% or more, furthermore 95% or more.

The relative density described herein means the ratio (%) of the measured density of the powder compacts of which the core 1 is composed to the theoretical density of the powder compacts. The true density of the soft magnetic material of which the powder compacts are composed can be used as the equivalent value of the theoretical density described above.

<Others>

The core 1 includes a resin portion, not illustrated, for securing the teeth 2 and the flange portions 5 to each other. The core 1 that includes the resin portion is readily handled as a single piece because the body 4 and the flange portions 5 are not separated from each other.

The resin portion described above is composed of, for example, an adhesive that is filled in spaces between the teeth 2 and the flange portions 5. Alternatively, the resin portion may be a molded portion that collectively covers the body 4 and the flange portions 5. Parts of the molded portion are filled in the spaces between the teeth 2 and the flange portions 5. The molded portion that covers the core 1 functions as a member that increases electrical insulation between the core 1 and the coils 80 (FIG. 7) and as a member for mechanical protection and protection from external environment. The molded portion may collectively cover the core 1 and the coils 80 (FIG. 7).

<Manufacturing Method>

The powder compact of which the body 4 is composed and the powder compact of which each flange portion 5 is composed can be manufactured by compressing and compacting the material powder into a predetermined shape as described above. For compressing and compacting, a press compacting machine, for example, can be used. The material powder may contain a binder and lubricant in addition to the powder of the soft magnetic material. Lubricant may be applied to the mold.

The average particle diameter of the powder of the soft magnetic material that is used for the material powder is, for example, no less than 20 μm and no more than 350 μm. When the average particle diameter of the powder described above is in the range described above, the powder described above is readily handled, and compressing and compacting are readily performed. The average particle diameter of the powder described above may be no less than 40 μm and no more than 300 μm, furthermore 250 μm or less. The average particle diameter of the powder described above is measured by using a laser diffraction/scattering particle-size/grain-size distribution-measuring device such that cumulative mass is equal to 50% of the mass of all of the particles.

Increasing pressure during compressing and compacting facilitates the densification and enables the core 1 having high relative density to be manufactured. The pressure described above is, for example, 700 MPa or more, furthermore 980 MPa or more.

After compressing and compacting, a heat treatment is performed on the compact as needed. For example, the core 1 having low loss is manufactured by performing the heat treatment to remove distortion. Alternatively, for example, the binder and the lubricant are removed by the heat treatment. In the case where the material powder contains the coating particles described above, the temperature of the heat treatment is preferably equal to or less than the temperature at which the insulating coatings are dissolved.

Main Action and Effect According to Embodiment

Although the core 1 according to the embodiment includes the flange portions 5, the flange portions 5 and the body 4 that includes the teeth 2 are separated members. For this reason, the core 1 enables the coils 80 to be disposed on the respective teeth 2 with no flange portions 5 disposed on the teeth 2. The stator and the axial-gap rotary electric machine that include the core 1 have excellent manufacturability.

In particular, the core 1 according to the embodiment includes the frame-shaped flange portions 5 from which the end surfaces 20 of the teeth 2 are exposed, and the exposed area ratio is in a predetermined range. For this reason, the axial-gap rotary electric machine that includes the core 1 can inhibit the torque from decreasing and has high torque. The effect of inhibiting the torque from decreasing will be specifically described with test examples described later.

[Stator]

The stator 8 according to the embodiment will be described with reference to FIG. 7.

The stator 8 according to the embodiment includes the core 1 and the coils 80 that are disposed on the respective teeth 2 that are included in the core 1. The stator 8 is used in an axial-gap rotary electric machine such as the rotary electric machine 9. FIG. 7 illustrates the case where the core 1 illustrated in FIG. 1 is included.

Each coil 80 includes a tubular portion obtained by spirally winding a wire. The coil 80 in this example is an edgewise winding coil that includes a rectangular coated wire as the wound wire and that has a square tube shape. FIG. 7 illustrates only the tubular portion, and both of end portions of the wound wire are omitted therein.

The stator 8 according to the embodiment includes the core 1 according to the embodiment in which the teeth 2 and the flange portions 5 are separatable from each other. For this reason, the coils 80 can be readily disposed on the respective teeth 2 in a manner in which the coils 80 are manufactured in advance, and the coils 80 are fitted outside the respective teeth 2 before the flange portions 5 are disposed. The stator 8 in which the coils 80 are interposed between the yoke 3 and the flange portions 5, and the teeth 2 are inserted can be manufactured in a manner in which the flange portions 5 are fixed to the end portions of the respective teeth 2 after the coils 80 are inserted into the teeth 2. As for the stator 8 that includes the core 1, a process of winding the wire and a process of disposing the coils 80 on the teeth 2 can be separated during manufacturing. For this reason, it is not necessary to directly wind the wire around the teeth 2. Accordingly, the wire is readily wound, and the coils 80 are readily manufactured.

In addition, the stator 8 according to the embodiment includes the core 1 according to the embodiment, can consequently inhibit the torque from decreasing, and enables an axial-gap rotary electric machine having high torque to be constructed.

[Rotary Electric Machine]

The rotary electric machine 9 according to the embodiment will be described with reference to FIG. 8.

Figure 8:
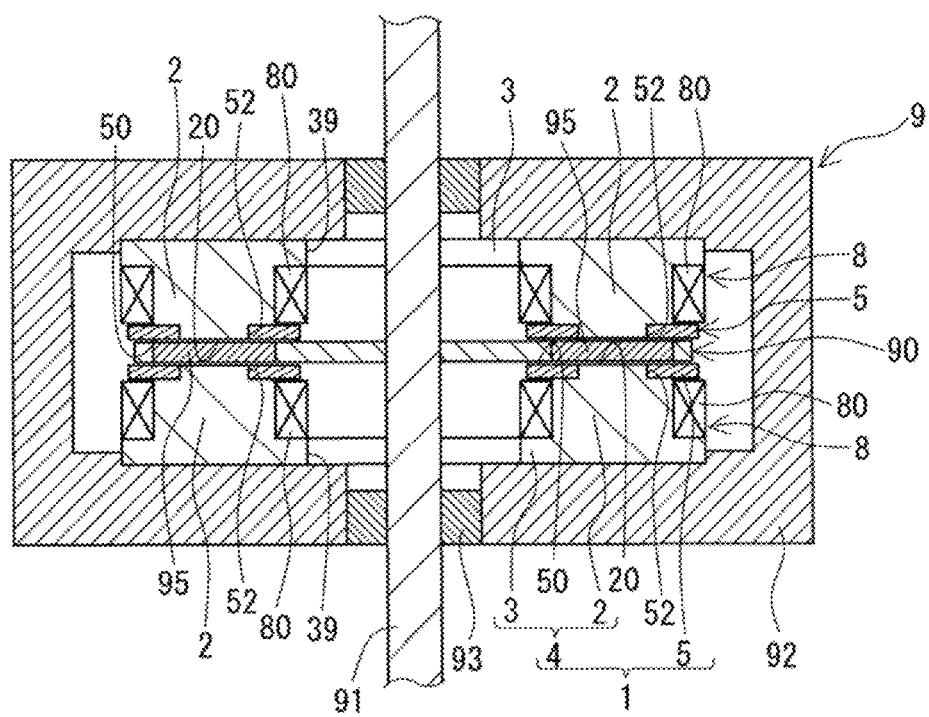
FIG. 8 is a schematic sectional view illustrating an example of a rotary electric machine according to the embodiment.

FIG. 8 is a sectional view taken along a plane parallel to the rotation shaft 91 of the rotary electric machine 9.

The rotary electric machine 9 according to the embodiment includes the stators 8 according to the embodiment. Specifically, the rotary electric machine 9 and is an axial-gap rotary electric machine that includes the rotor 90 and the stators 8 and in which the rotor 90 and the stators 8 face each other in the axial direction. The rotary electric machine 9 can be used in a motor or a generator. FIG. 8 illustrates, by way of example, a single rotor-double stator type in which the single rotor 90 is installed so as to be interposed between two stators 8. The single rotor 90 and the single stator 8 are included according to another embodiment, and the single stator 8 is installed so as to be interposed between two rotors 90 according to another embodiment.

The stator 8 and the rotor 90 are contained in a case 92 that has a columnar interior space. The case 92 includes a cylindrical portion and two plate portions. The cylindrical portion surrounds the outer circumferences of the stators 8 and the rotor 90. The plate portions are disposed on both sides of the cylindrical portion. The stators 8 and the rotor 90 are contained in the case 92 so as to be interposed between the two plate portions. Each stator 8 is fixed to the case 92 in a manner in which the outer circumferential surface of the yoke 3 of the core 1 is fitted in the plate portion of the case 92. Each plate portion has a through-hole at the center thereof. A bearing 93 is disposed in the through-hole, and the rotation shaft 91 is inserted through the bearing 93. A bearing, not illustrated, is disposed in the axial hole 39 of the yoke 3, and the rotation shaft 91 is inserted through the bearing. The rotation shaft 91 extends through the case 92.

The rotor 90 is a member that has a plate shape and that includes multiple magnets 95 and a rotor body that supports the magnets 95. Each magnet 95 has, for example, a plate shape including a planar shape following the planar shape of the flange portions 5. The rotor body is an annular member and is rotatably supported by the rotation shaft 91. The magnets 95 are arranged in a regular interval in the circumferential direction of the rotor body. The magnets 95 are magnetized in the axial direction of the rotation shaft 91. The directions of magnetization of the magnets 95 adjacent in the circumferential direction of the rotor body are opposite directions. When the rotor body rotates, the magnets 95 rotate together with the rotor body.

The stator 8 is disposed such that the end surfaces 20 of the teeth 2 and the end surfaces 50 of the flange portions 5 face the magnets 95 of the rotor 90. When the rotor 90 rotates, the end surfaces 20 of the teeth 2 and the end surfaces 50 of the flange portions 5 receive the magnetic flux from the rotating magnets 95.

The rotary electric machine 9 according to the embodiment includes the stators 8 according to the embodiment. Since the stators 8 are readily assembled as described above, the rotary electric machine 9 has excellent manufacturability. The rotary electric machine 9 according to the embodiment includes the stators 8 according to the embodiment, can consequently inhibit the torque from decreasing, and has high torque.

Test Examples

Torque when cores each of which includes an annular yoke, teeth, and flange portions that are disposed on end portions of the respective teeth are used in a stator of a three-phase alternating current axial-gap motor is investigated by simulation.

In tests below, analysis is made by using electromagnetic field analysis software, here "JMAG" made by JSOL Corporation. The model of each core used for the simulation is composed of pure iron and is a powder compact having a relative density of 90% or more. The shape of the inner circumference and the shape of the outer circumference of each flange portion, and the shape of the end surface of each tooth are similar trapezoidal shapes and are substantially similar to the shape of the circumferential surface of the tooth. The long side portion of each trapezoid in the flange portion and the tooth is located on the side of the flange portion near the outer circumferential edge of the yoke. Each core has substantially the same size. In the tests below, the torque is investigated without changing conditions in which the coils that are disposed on the teeth are energized and in which the magnets that are disposed on the end portions of the teeth rotate, except that the shapes of the cores and the distances between the teeth and the flange portions, for example, are changed.

Test Example 1

In this test, the influence of the difference in the position of division on the torque is investigated regarding the model of each core that includes the yoke, the teeth, and the flange portions.

DESCRIPTION OF SAMPLE

The core of a sample No. 100 has ideal shape on the presumption that the yoke, the teeth, and the flange portions are integrally compacted. The core of the sample No. 100 is not a combination of divided pieces but a single compact, and there are no spaces that can be the magnetic gaps between the yoke and the teeth and between the teeth and the flange portions.

The core of a sample No. 101 is a core in which the teeth and the flange portions are divided unlike the ideal core of the sample No. 100. That is, the yoke and the teeth of the core are composed of a single compact, and the flange portions are members separated from the single compact described above. The flange portions are composed of a plate material that has no through-hole and are joined to the end surfaces of the teeth. For this reason, the core of the sample No. 101 has spaces that can be the magnetic gaps between the teeth and the flange portions. The area of each space described above is equal to the sectional area of each tooth. The distance between the spaces described above is 0.1 mm. As for the core of the sample No. 101, the magnetic gaps described above are the perpendicular gaps extending in the direction perpendicular to the magnetic flux.

The cores of samples No. 102 and No. 103 are cores in which the yoke and the teeth are divided unlike the ideal core of the sample No. 100. That is, the teeth and the flange portions of each core are composed of a single compact, and the yoke is a member separated from the single compact described above.

In the core of the sample No. 102, the yoke is composed of an annular plate material, and the end surfaces of the teeth are joined to a surface of the yoke. The surface of the yoke and the end surfaces of the teeth are flat surfaces. For this reason, the core of the sample No. 102 has spaces that can be the magnetic gaps between the yoke and the teeth. The area of each space described above is equal to the sectional area of each tooth. The distance between the spaces described above is 0.1 mm. In the core of the sample No. 102, the magnetic gaps described above are the perpendicular gaps extending in the direction perpendicular to the magnetic flux.

In the core of the sample No. 103, the yoke is composed of an annular plate material that has through-holes in which the end portions of the teeth are inserted. For this reason, the core of the sample No. 103 has annular spaces that can be the magnetic gaps between the inner circumferential surfaces around the through-holes of the yoke and the outer circumferential surfaces of the end portions of the teeth. The annular spaces described above have uniform widths in the circumferential direction of the through-holes described above, and the widths described above are 0.1 mm.

The core of a sample No. 104 is a core in which the teeth are divided in the direction perpendicular to the axial direction unlike the ideal core of the sample No. 100. That is, the core includes a divided piece in which parts of the teeth and the yoke are composed of a single compact, and a divided piece in which the rest of the teeth and the flange portions are composed of a single compact. For this reason, the core of the sample No. 104 has spaces that can be the magnetic gaps at intermediate positions in the axial direction of the teeth. The area of each space described above is equal to the sectional area of each tooth. The distance between the spaces described above is 0.1 mm. In the core of the sample No. 104, the magnetic gaps described above are the perpendicular gaps extending in the direction perpendicular to the magnetic flux.

The core of a sample No. 1 is a core in which the teeth and the flange portions are divided unlike the ideal core of the sample No. 100. That is, the yoke and the teeth of the core are composed of a single compact, and the flange portions are members separated from the single compact described above. The flange portions are frame-shaped members that have through-holes in which the end portions of the teeth are inserted, and the end surfaces of the teeth are exposed from the through-holes. The core of the sample No. 1 has annular spaces that can be the magnetic gaps between the outer circumferential surfaces of the end portions of the teeth and the inner circumferential surfaces around the through-holes of the flange portions. The annular spaces described above have uniform widths in the circumferential direction of the through-holes described above, and the widths described above are 0.1 mm. Each tooth has the step portion at the end portion. The height h of the step portion is equal to the thickness t of the flange portion. The exposed area ratio of the core of the sample No. 1 is 37.7%. A method of obtaining the exposed area ratio will be described with the test example 2.

Test Condition

In this test, a motor that includes a stator core described below is presumed, and the torque of the motor is considered.

Stator Core Condition

A coil winding number is 30 turns.
The core is a 14-pole 12-slot core.
The sectional area of each tooth is 102 mm$^2$.
The outer diameter of the yoke is 100 mm.
The inner diameter of the yoke is 70 mm.
The torque (N·m) of each sample is illustrated in table 1. The torque of the sample No. 100 is used as reference, and a decrease ratio (%) of the torque of each sample is obtained. The decrease ratio of the torque is obtained as {(the torque of the sample−the torque of the sample No. 100)/the torque of the sample No. 100}×100. The decrease ratio (%) of the torque is also illustrated in Table 1.

TABLE 1

| Sample No. | Core Shape | Torque (N · m) | Torque Decrease Ratio (%) |
|---|---|---|---|
| 100 | No Division | 3.28 | — |
| 101 | Flange Portions: Separated Yoke•Teeth: Integrally formed | 3.01 | −8% |
| 102 | Yoke: Separated Teeth•Flange Portions: Integrally formed | 3.00 | −9% |
| 103 | Yoke: Separated Teeth•Flange Portions: Integrally formed Yoke Has Holes | 3.06 | −7% |
| 104 | Teeth: Divided | 2.96 | −10% |
| 1 | Flange Portions: Separated Yoke•Teeth: Integrally formed Flange Portions Have Holes | 3.22 | −2% |

As illustrated in Table 1, it can be understood that the decrease ratio of the torque of the sample No. 1 with respect to the sample No. 100 is lower than those in the samples No. 101 to No. 104, and the sample No. 1 has high torque. Quantitatively, the decrease ratio of the torque of the sample No. 1 is less than 7%, furthermore 5% or less. A reason for this is presumably that the yoke and the teeth of the core of the sample No. 1 are integrally formed into a single piece, and the magnetic flux readily passes through the yoke from the teeth. This is supported by the fact that the torque of the sample No. 101 is more than the torque of the sample No. 102. Another reason is presumably that the core of the sample No. 1 has small spaces between divided pieces, the spaces described above are unlikely to be the magnetic gaps, particularly the perpendicular gaps. This is supported by the fact that the torque of the samples No. 101, No. 102, and No. 104 that have the large perpendicular gaps is very small and that the torque of the sample No. 1 is larger than the torque of the sample No. 101.

This test demonstrates that in the case where a core that includes a yoke, teeth, and flange portions is divided, the following structure is preferably used. The yoke and the teeth are integrally formed into a single piece, and the flange portions are separated members. Each flange portion has a through-hole. Each tooth is inserted in the through-hole, and the end surface of the tooth is exposed from the through-hole.

Test Example 2

In this test, the size of the through-hole of each flange portion and the area of the end surface of each tooth that is exposed from the through-hole are changed from those in the core of the sample No. 1 used in the test example 1. The influence of the difference in the area of the tooth that is exposed from the through-hole of the flange portion on the torque is investigated.

The basic structure of the core of each sample used in the test is the same as that of the sample No. 1. That is, the distance between the outer circumferential surface of the end portion of each tooth and the inner circumferential surface around the through-hole of the flange portion is 0.1 mm, the tooth has the step portion, and the height h=the thickness t is satisfied. The distance described above is uniform over the entire circumference of the through-hole.

In each sample, the area $S_5$ within the outer circumferential edge of each flange portion and the area $S_2$ of the end surface of each tooth that is exposed from the through-hole of the flange portion are obtained. The area $S_5$ of the flange portion includes the area of the through-hole of the flange portion. The ratio of the area $S_2$ of the tooth to the area $S_5$ of the flange portion, that is, the exposed area ratio (%) is obtained as $(S_2/S_5) \times 100$, and the value thereof is illustrated in Table 2. The torque (N·m) of each sample is illustrated in Table 2. The torque of the sample No. 100 is used as reference as in the test example 1, the decrease ratio (%) of the torque of each sample is obtained, and the result is illustrated in Table 2.

TABLE 2

| Sample No. | Exposed Area Ratio $(S_2/S_5) \times 100$ | Torque (N · m) | Torque Decrease Ratio (%) |
|---|---|---|---|
| 105 | 5.3% | 3.04 | −7% |
| 3 | 7.5% | 3.15 | −4% |
| 2 | 10.2% | 3.20 | −2% |
| 1 | 37.7% | 3.22 | −2% |

As illustrated in Table 2, it can be understood that the decrease ratio of the torque of the samples No. 1 to No. 3 with respect to the sample No. 100 is lower than that in a sample No. 105, and the samples No. 1 to No. 3 have high torque. Quantitatively, the decrease ratio of the torque of the samples No. 1 to No. 3 is less than 7%. In particular, the decrease ratio of the torque of the samples No. 1 and No. 2 is 5% or less. A reason for this is presumably that since the exposed area ratios of the cores of the samples No. 1 to No. 3 are higher than that of the core of the sample No. 105, the teeth that are exposed from the through-holes of the flange portions directly receive the magnetic flux, and the magnetic flux readily passes through the teeth from the flange portions.

This test demonstrates that when the exposed area ratio is 5.5% or more, particularly 7.5% or more, the torque can be effectively inhibited from decreasing, and high torque is readily achieved. It can be understood from this test that as the exposed area ratio increases, here the exposed area ratio is 30% or more, furthermore 35% or more, the torque is more readily inhibited from decreasing. The upper limit of the exposed area ratio is not particularly limited, and the exposed area ratio may be, for example, 90%, provided that the flange portions can be disposed on the teeth.

Test Example 3

In this test, the core of the sample No. 2 used in the test example 2 is changed such that the end surfaces of the teeth are biasedly disposed in the through-holes of the flange portions, and the distance between the outer circumferential surface of the end portion of each tooth and the inner circumferential surface around the through-hole of the flange portion is non-uniform in the circumferential direction of the through-hole. The influence of the difference in the distance described above on the torque is investigated.

In the core of each sample used in this test, the area of the end surface of each tooth and the area within the outer circumferential edge of each flange portion is constant, and the exposed area ratio is equal to that in the sample No. 2, that is 10.2%. The shape of the inner circumference and the shape of the outer circumference of the flange portion and the shape of the end surface of the tooth are similar trapezoidal shapes and are substantially similar to the shape of the circumferential surface of the tooth. The tooth has the step portion, and the height h=the thickness t is satisfied. The size of the through-hole of the flange portion of the core is changed such that the distance described above satisfies the maximum difference (mm) in the distance illustrated in Table 3. The end surface of the tooth is biasedly disposed in the through-hole of the flange portion. The maximum difference in the distance in Table 3 is the difference between the maximum value of the distance described above and the minimum value of the distance described above.

Here, the regions in which the outer circumferential surfaces of the end portions of the teeth and the inner circumferential surfaces around the through-holes of the flange portions are in contact with each other, that is, the proximity regions in which the distance described above is 0.05 mm or less are mainly located on the same side in the circumferential direction of the yoke. Regions in which the distance described above is long are located on the opposite side in the circumferential direction of the yoke. The minimum value of the distance described above is 0 mm, and the maximum value of the distance described above is equal to the maximum difference in the distance illustrated in Table 3 (mm). The ratio of the length of the proximity region in the circumferential direction of each flange portion to the circumferential length of the through-hole of the flange portion, that is, the joining ratio is 45% and is more than 20%.

The torque (N·m) of each sample is illustrated in Table 3. The torque of the sample No. 100 is used as reference as in the test example 1, the decrease ratio (%) of the torque of each sample is obtained, and the result is illustrated in Table 3.

TABLE 3

| Sample No. | Maximum Difference in Distance Maximum Value~Minimum Value (mm) | Torque (N • m) | Torque Decrease Ratio (%) |
|---|---|---|---|
| 15 | 0.50 | 3.08 | −6% |
| 4 | 0.38 | 3.12 | −5% |
| 5 | 0.30 | 3.20 | −2% |

As illustrated in Table 3, it can be understood that the decrease ratio of the torque of samples No. 4, No. 5, and No. 15 with respect to the sample No. 100 is small, and high torque is achieved. Quantitatively, the decrease ratio of the torque of the samples No. 4, No. 5, and No. 15 is less than 7%. In particular, the decrease ratio of the torque of the samples No. 4 and No. 5 is 5% or less and is lower than the decrease ratio of the torque of the sample No. 15. A reason for this is presumably that the maximum difference in the distance in the cores of the samples No. 4 and No. 5 is less than 0.40 mm and is small, and that the spaces between the teeth and the through-holes of the flange portions are unlikely to be the magnetic gaps. In particular, the decrease ratio of the torque of the sample No. 5 is 3% or less, and the torque is less decreased than that of the sample No. 4. It can be thought from this that the maximum difference in the distance in the core of the sample No. 5 is 0.30 mm or less and is further decreased, and consequently, the spaces between the teeth and the through-holes of the flange portions are more unlikely to be the magnetic gaps. In this test, the core of the sample No. 5 has 0.30 mm spaces between the teeth and the through-holes of the flange portions but has high torque almost equal to that in the sample No. 2 described above.

This test demonstrates that when the maximum difference in the distance is less than 0.40 mm, preferably 0.30 mm or less, the torque can be effectively inhibited from decreasing, and high torque is readily achieved. The lower limit of the maximum difference in the distance is not particularly limited. The maximum difference in the distance may be, for example, 0 mm, provided that the flange portions and the teeth can be manufactured with high precision and can be assembled without the damage thereof.

Test Example 4

In this test, the core of the sample No. 2 used in the test example 2 is changed such that the distance between the outer circumferential surface of the end portion of each tooth and the inner circumferential surface around the through-hole of the flange portion is non-uniform in the circumferential direction of the through-hole as in the test example 3. Each flange portion has the proximity region in which the distance described above is 0.05 mm or less, and the length of the proximity region in the circumferential direction of the through-hole of the flange portion and the position thereof are changed. The influence of the difference in the length and the position of the proximity region described above on the torque is investigated.

The basic matters of the core of each sample used in this test are the same as those in the test example 3. That is, the area of the end surface of each tooth and the area within the outer circumferential edge of each flange portion are constant. The exposed area ratio is 10.2%, the tooth has the step portion, and the height h=the thickness t is satisfied. The maximum difference in the distance is 0.20 mm and is less than 0.40 mm.

The core of a sample No. 7 has the proximity region on the side of each flange portion near the outer circumferential edge of the yoke. The core of a sample No. 6 has the proximity region on the side of each flange portion near the inner circumferential edge of the yoke, and the length of the proximity region described above is shorter than that in the sample No. 7.

As for the core of each sample, the circumferential length $L_5$ of the through-hole of each flange portion and the length $L_{55}$ of the proximity region in the circumferential direction of the flange portion are obtained. The ratio of the length $L_{55}$ of the proximity region to the circumferential length $L_5$, that is, the joining ratio is obtained as $(L_{55}/L_5) \times 100$, and the value thereof is illustrated in Table 4. The torque (N·m) of each sample is illustrated in Table 4. The torque of the sample No. 100 is used as reference as in the test example 1, the decrease ratio (%) of the torque of each sample is obtained, and the result is illustrated in Table 4.

TABLE 4

| Sample No. | Proximity Region Joining Ratio | Torque (N · m) | Torque Decrease Ratio (%) |
|---|---|---|---|
| 16 | 10% | 3.08 | −6% |
| 6 | 22% | 3.13 | −5% |
| 7 | 37% | 3.22 | −2% |

As illustrated in Table 4, it can be understood that the decrease ratio of the torque of the cores of the samples No. 6, No. 7, and No. 16 with respect to the sample No. 100 is small, and high torque is achieved. Quantitatively, the decrease ratio of the torque of the samples No. 6, No. 7, and No. 16 is less than 7%. In particular, the decrease ratio of the torque of the samples No. 6 and No. 7 is 5% or less and is lower than the decrease ratio of the torque of the sample No. 16. A reason for this is presumably that the joining ratio of each proximity region of the cores of the samples No. 6 and No. 7 is more than 20%, and the magnetic flux readily passes through each tooth from the proximity region. In particular, the decrease ratio of the torque of the sample No. 7 is 3% or less, and the torque is less decreased than that of the sample No. 6. It can be thought from this that the joining ratio of the proximity region in the core of the sample No. 7 is 35% or more and is further increased, and the magnetic flux more readily passes through the tooth from the proximity region. In this test, the maximum difference in the distance described above in the core of the sample No. 7 is larger than that in the sample No. 2 described above, but the core of the sample No. 7 has high torque equal to or more than that in the sample No. 2.

This test demonstrates that when the joining ratio of the proximity region is more than 20%, preferably 30% or more, furthermore 35% or more in the case where each flange portion has the proximity region, the torque can be effectively inhibited from decreasing, and high torque is readily achieved. This test also demonstrates that the joining ratio of the proximity region is increased, for example, in a manner in which the proximity region is located on the flange portion in the outer circumferential region of the yoke. The upper limit of the joining ratio of the proximity region is not particularly limited. For example, the flange portion may have the proximity region extending over the entire circumference of the through-hole. That is, the joining ratio of the proximity region may be 100%.

Test Example 5

In this test, the core of the sample No. 2 used in the test example 2 is changed such that the distance between the outer circumferential surface of the end portion of each tooth and the inner circumferential surface around the through-hole of the flange portion is non-uniform in the circumferential direction of the through-hole as in the test example 4. The flange portion has the proximity region in which the distance described above is 0.05 mm or less, and the position of the proximity region is changed. The influence of the difference in the position of the proximity region described above and the difference in the rotation direction of the rotor on the torque is investigated.

The basic matters of the core of each sample used in this test are the same as those in the test example 4. That is, the area of the end surface of each tooth and the area within the outer circumferential edge of each flange portion are constant. The exposed area ratio is 10.2%, the tooth has the step portion, and the height h=the thickness t is satisfied. The maximum difference in the distance is 0.2 mm and is less than 0.40 mm. The joining ratio of each proximity region is 22% and is more than 20%.

In the cores of samples No. 8 and No. 9, the flange portions that are fixed to the adjacent teeth have the proximity regions on the sides that the teeth face. That is, the proximity regions of the adjacent flange portions face each other. In the core of the sample No. 8, coils for different phase are disposed on the adjacent teeth described above. In the core of the sample No. 9, coils for same phase are disposed on the adjacent teeth described above.

In the cores of samples No. 10 and No. 11, the proximity region of each flange portion is located on the same side in the circumferential direction of the yoke. In the core of the sample No. 10, the proximity region of each flange portion is located on the same side in the rotation direction of the rotor. In the core of the sample No. 11, the proximity region of each flange portion is located on the opposite side in the rotation direction of the rotor.

The torque (N·m) of each sample is illustrated in Table 5. The torque of the sample No. 100 is used as reference as in the test example 1, the decrease ratio (%) of the torque of each sample is obtained, and the result is illustrated in Table 5.

TABLE 5

| Sample No. | Proximity Region Position | Torque (N · m) | Torque Decrease Ratio (%) |
|---|---|---|---|
| 8 | Face (DifferentPhase) | 3.18 | −3% |
| 9 | Face (Same Phase) | 3.20 | −2% |
| 10 | Same Side in Rotation Direction | 3.21 | −2% |
| 11 | Opposite Side in Rotation Direction | 3.19 | −3% |

As illustrated in Table 5, it can be understood that the decrease ratio of the torque of the samples No. 8 to No. 11 with respect to the sample No. 100 is relatively small, and high torque is achieved. Quantitatively, the decrease ratio of the torque of the samples No. 8 to No. 11 is 5% or less. A reason for this is presumably that the cores of the samples No. 8 to No. 11 have the proximity regions, and the magnetic flux readily passes through the teeth from the proximity regions. In this test, all of the cores of the samples No. 8 to No. 11 have the spaces between the teeth and the through-holes of the flange portions but have high torque almost equal to that in the sample No. 2 described above.

This test demonstrates that in the case where the flange portions that are fixed to the adjacent teeth have the proximity regions on the sides that the teeth face, and the coils for same phase are disposed on the respective teeth, the torque is more readily inhibited from decreasing (see the sample No. 9). This test also demonstrates that in the case where the proximity region of each flange portion is located on the same side in the circumferential direction of the yoke, and the position of the proximity region is located on the same side in the rotation direction of the rotor, the torque is more readily inhibited from decreasing (see the sample No. 10).

Test Example 6

In this test, the height h (mm) of the step portion of each tooth of the core of the sample No. 1 used in the test examples 1 and 2 is changed, and the height of the protruding part of the tooth that is exposed from the through-hole of the flange portion is changed. The influence of the difference in the height of the protruding part of the tooth on the torque and on the cogging torque is investigated.

This test is the same as the sample No. 1 except that the height h (mm) of the step portion of each tooth of the core of the sample No. 1 used in the test examples 1 and 2 is changed. That is, the area of the end surface of the tooth and the area within the outer circumferential edge of each flange portion are constant. The exposed area ratio is 37.7%. The distance between the outer circumferential surface of the end portion of the tooth and the inner circumferential surface around the through-hole of the flange portion is 0.1 mm. The distance described above is uniform over the entire circumference of the through-hole. The height h (mm) of the step portion of the tooth and the thickness t (mm) of the flange portion in each sample are illustrated in Table 6.

At the corner portions of the end portion of each tooth of the core of the sample No. 1, the angle formed between the bottom surface of the step portion and the circumferential surface of the step portion is 90°. The angle formed between the inner circumferential surface of each flange portion and the surface of the flange portion that is placed on the bottom surface of the step portion is 90°. The end surface of the tooth and the end surface of the flange portion are flush with each other. The matters about the angles are the same as those in the samples including the step portions among the test examples 1 to 5 described above.

The shapes of samples No. 12 to No. 14 are shapes obtained by flattening the corner portions of a part of the end portion of each tooth that protrudes from the end surface of the flange portion. The end portion of the tooth includes the inclined surface that intersects the end surface of the tooth. The angle formed between the inclined surface of the tooth and an extension surface from the end surface of the tooth is selected from the range from 5° to 60°. The inclined surface of the tooth is exposed from the through-hole of the flange portion. In the samples No. 12 to No. 14, the area of the end surface of the tooth is somewhat smaller than that in the sample No. 1 due to the flattened shape in a strict sense. In view of this, the exposed area ratio described herein means the maximum sectional area of a portion of the tooth along the end surface of the flange portion.

The torque (N·m) and the cogging torque (cN·m, centinewton meter) of each sample are illustrated in Table 6. The torque of the sample No. 100 is used as reference as in the test example 1, the decrease ratio (%) of the torque of each sample is obtained, and the result is illustrated in Table 6.

TABLE 6

| Sample No. | Δ(h − t) (mm) | Torque (N·m) | Torque Decrease Ratio (%) | Cogging Torque (cN·m) | Teeth Step Portion Height h (mm) | Thickness t (mm) |
|---|---|---|---|---|---|---|
| 1 | 0 | 3.22 | −2% | 5.1 | 2 | 2 |
| 12 | 1 | 3.19 | −3% | 4.2 | 3 | 2 |
| 13 | 2 | 3.15 | −4% | 3.1 | 4 | 2 |
| 14 | 3 | 3.12 | −5% | 1.3 | 5 | 2 |

As illustrated in Table 6, it can be understood that the decrease ratio of the torque of the samples No. 1 and No. 12 to No. 14 with respect to the sample No. 100 is relatively small, and high torque is achieved. Quantitatively, the decrease ratio of the torque of the samples No. 12 to No. 14 is 5% or less. A reason for this is presumably that since the cores of the samples No. 12 to No. 14 have a high exposed area ratio as in the sample No. 1, the teeth that are exposed from the through-holes of the flange portions directly receive the magnetic flux, and the magnetic flux readily passes through the teeth from the flange portions.

The size of the cogging torque differs among the samples No. 1 and No. 12 to No. 14. The larger the difference Δ(h−t) (mm) between the height h (mm) of the step portion of each tooth and the thickness t (mm) of the flange portion, the smaller the cogging torque. Quantitatively, the cogging torque is effectively decreased when the difference Δ(h−t) is more than 0 mm, here the difference increases to 1 mm or more unlike the sample No. 1 in which the difference Δ(h−t) is 0 mm. However, the larger the difference Δ(h−t), the smaller the torque. This is supported by, for example, comparison and reference of the samples No. 12 and No. 14.

This test demonstrates that in the case where each tooth includes the step portion at the end portion, the cogging torque can be decreased by adjusting the height h of the step portion of the tooth and the thickness t of the flange portion such that the end surface of the tooth protrudes from the through-hole of the flange portion. In particular, it can be said that when the difference Δ(h−t) is more than 0 mm and no more than 3 mm, the cogging torque is deceased, and the torque is inhibited from decreasing.

The test examples 1 to 6 described above demonstrate that when the cores that include the flange portions on the end portions of the teeth satisfy conditions (1) to (3) below, the torque can be inhibited from decreasing unlike a single piece into which the teeth, the yoke, and the flange portions are integrally formed. It can be said that when the condition (1) below is satisfied, the axial-gap rotary electric machine and the stator that is used in the rotary electric machine are readily assembled and have excellent manufacturability unlike the single piece described above.

(1) The yoke and the teeth are integrally formed into a single piece, and the flange portions are members divided from the teeth.

(2) The flange portions have the through-holes, and the end surfaces of the teeth are exposed from the through-holes.

(3) The ratio of exposure of the end surface of each tooth from the through-hole of the flange portion, that is, the exposed area ratio is 7.5% or more.

The present invention is not limited to these examples, is shown by the claims, and includes all modifications having the same content and scope as the claims. For example, in the test examples 1 to 6 described above, the shapes of the teeth and the flange portions, the relative density, and the material of each core, for example, can be changed.

REFERENCE SIGNS LIST 1 core
2 teeth, 20 end surface, 21 circumferential surface, 22 inclined surface, 25 step portion,
   250 bottom surface, 251 circumferential surface
3 yoke, 30 surface, 39 axial hole
4 body
5 flange portion, 50 end surface, 51 outer circumferential edge, 52 through-hole, 520 inner circumferential surface
   53, 54 inclined surface, 55 proximity region, 56 outer circumferential region, 57 inner circumferential region
8 stator, 80 coil
9 rotary electric machine, 90 rotor, 91 rotation shaft, 92 case, 93 bearing 95 magnet $g_{min}$ minimum value of a distance, $g_{max}$ maximum value of the distance h height, t thickness, $\Delta(h-t)$ difference between a height and a thickness, $\theta$, $\alpha$ angle

The invention claimed is:

1. A core that is used in an axial-gap rotary electric machine, comprising:
   a body; and
   frame-shaped flange portions,
   wherein the body includes an annular yoke and columnar teeth that are arranged in a circumferential direction of the yoke,
   wherein the flange portions are fixed to end portions of the respective teeth,
   wherein the yoke and the teeth are composed of a single powder compact,
   wherein each of the flange portions is composed of a powder compact that has a through-hole,
   wherein the end portion of each of the teeth is inserted in the through-hole, and an end surface of each of the teeth is exposed from the through-hole,
   wherein a ratio of a first area of the end surface of each of the teeth to a second area within an outer circumferential edge of each of the flange portions is 7.5% or more in a plan view in an axial direction of the yoke, and the second area includes an area of the through-hole,
   wherein the teeth have step portions on which the flange portions are placed,
   wherein each of the step portions includes a bottom surface, which is a flat surface parallel to the end surface, and a circumferential surface,
   wherein each of the flange portions includes a lower surface that is placed on the bottom surface, and
   wherein the lower surface protrudes from the bottom surface in a direction perpendicular to the circumferential direction and the axial direction,
   wherein heights of the step portions are equal to or more than thicknesses of the flange portions,
   wherein a difference between the heights of the step portions and the thicknesses of the flange portions are more than 0 mm and no more than 3 mm,
   wherein the end portion of each of the teeth has an inclined surface that intersects the end surface of the tooth, and
   wherein an angle formed by the inclined surface with respect to an extension surface from the end surface is no less than 5° and no more than 60°.

2. The core according to claim 1, wherein an inner circumferential surface around the through-hole has a proximity region in which a distance between an outer circumferential surface of each end portion and the inner circumferential surface is 0.05 mm or less.

3. The core according to claim 2, wherein a ratio of a length of the proximity region along in the circumferential direction of the yoke to a circumference of the through-hole is more than 20%.

4. The core according to claim 2, wherein a difference between a maximum value and a minimum value of the distance between the outer circumference of each end portion and the inner circumference of the through-hole is less than 0.40 mm.

5. The core according to claim 2, wherein each of the flange portions has the proximity region at least a part of which is located on a side of the flange portion near an outer circumferential edge of the yoke.

6. The core according to claim 2, wherein each of the flange portions has the proximity region at least a part of which faces each other in the circumferential direction of the yoke.

7. The core according to claim 6, wherein coils for a same phase are disposed on the teeth adjacent to each other corresponding with each of the flange portions.

8. The core according to claim 2, wherein each of the flange portions has the proximity region at least a part of which is located on the same side in the circumferential direction of the yoke.

9. The core according to claim 1, wherein an angle formed between the bottom surface and the circumferential surface is 90°, and
   wherein an angle formed between an inner circumferential surface around the through-hole and the lower surface is 90°.

10. The core according to claim 1, wherein a material that forms the core includes pure iron, an iron-based alloy containing Si, or an iron-based alloy containing Al.

11. The core according to claim 10, wherein a relative density of the core is 90% or more of a theoretical density of the core.

12. A stator comprising:
    the core according to claim 1; and
    coils that are disposed on the respective teeth.

13. A rotary electric machine comprising:
    the stator according to claim 12.

14. The core according to claim 1, wherein a cross sectional shape of the teeth is trapezoidal.

15. The core according to claim 1, wherein a cross sectional shape of the teeth is triangular.

16. The core according to claim 1, wherein a shape of the flange portions is trapezoidal.

* * * * *